US006879962B1

(12) United States Patent
Smith et al.

(10) Patent No.: US 6,879,962 B1
(45) Date of Patent: Apr. 12, 2005

(54) LOGISTICS SYSTEM AND METHOD

(76) Inventors: Joseph D. Smith, 2511 Deep Sea Dr., Freeport, TX (US) 77541-9102; Austin L. Higgs, 110 Acacia St., Freeport, TX (US) 77566-5330; Thien K. Nguyen, 2514 Deep Sea Dr., Freeport, TX (US) 77541-9102

(*) Notice: Subject to any disclaimer, the term of this patent is extended or adjusted under 35 U.S.C. 154(b) by 767 days.

(21) Appl. No.: 09/396,287

(22) Filed: Sep. 15, 1999

Related U.S. Application Data

(63) Continuation-in-part of application No. 09/317,388, filed on May 24, 1998.
(60) Provisional application No. 60/119,378, filed on Feb. 9, 1999, and provisional application No. 60/125,658, filed on Mar. 22, 1999.

(51) Int. Cl.[7] .............................................. G06F 17/60
(52) U.S. Cl. ................................ 705/22; 705/7; 705/6; 705/8; 705/1; 705/500; 705/28
(58) Field of Search ............................... 705/7, 6, 8, 1, 705/500, 22, 28

(56) References Cited

U.S. PATENT DOCUMENTS

| | | | | | |
|---|---|---|---|---|---|
| 4,509,123 A | * | 4/1985 | Vereen | ....................... | 700/130 |
| 4,920,488 A | * | 4/1990 | Filley | .......................... | 705/28 |
| 5,043,908 A | * | 8/1991 | Manduley et al. | .......... | 700/227 |
| 5,045,839 A | * | 9/1991 | Ellis et al. | .................... | 340/539 |
| 5,434,775 A | * | 7/1995 | Sims et al. | ..................... | 705/8 |
| 5,630,072 A | * | 5/1997 | Dobbins | ....................... | 705/22 |
| 5,666,493 A | * | 9/1997 | Wojcik et al. | ................. | 705/26 |
| 5,712,989 A | * | 1/1998 | Johnson et al. | ............... | 705/28 |
| 5,835,377 A | * | 11/1998 | Bush | ........................... | 700/99 |
| 5,867,122 A | * | 2/1999 | Zahm et al. | ........... | 342/357.07 |
| 5,914,671 A | * | 6/1999 | Tuttle | ....................... | 340/10.42 |
| 5,978,771 A | * | 11/1999 | Vandivier | ....................... | 705/8 |
| 5,987,423 A | * | 11/1999 | Arnold et al. | ................. | 705/14 |
| 6,014,628 A | * | 1/2000 | Kovarik, Jr. | .................... | 705/1 |
| 6,058,423 A | * | 5/2000 | Factor | ........................ | 709/226 |

FOREIGN PATENT DOCUMENTS

| | | | | | |
|---|---|---|---|---|---|
| JP | 53091603 A | * | 8/1978 | ............ | H04H/1/00 |
| JP | 11225299 A | * | 8/1999 | .......... | H04N/5/445 |

OTHER PUBLICATIONS

"Defence: Reflections From NATO Ministers Highlight EU Concerns Too", Oct. 14, 2000, European Report, p104.*

* cited by examiner

*Primary Examiner*—Tariq R. Hafiz
*Assistant Examiner*—Akiba Robinson-Boyce
(74) *Attorney, Agent, or Firm*—Kenneth L. Nash

(57) ABSTRACT

A logistics method is disclosed that provides logistics computer programming for controlling a plurality of transports to supply a plurality of delivery locations from one or more bases. Each of the bases and delivery locations are in communication with a central database, preferably an Internet server database, that contains updated logistics information. The central database is preferably automatically updated at selectable intervals as to transport location, destination, fuel level, speed, and heading. Manifests may be originated at the respective delivery location or at an associated base and are stored in the central database. Each material on the manifest is associated with information such as the authorized vendor, a description, storage preferences, units, hazardous designations and additional information if the material is hazardous. Given information about each transport such as load capacity, fuel level, location intelligence, and the like that is stored in the central database and information about the materials, manifest status, and other factors, potential least cost delivery routes using capable transports can be automatically produced for selection by an operator. The logistics computer programming automatically designates places where each manifested material is stored on the transport. The computer programming associates a status designation with each manifest such as outstanding, staged, printed, loaded, unloaded, and cancelled. Each manifest is also associated with a priority which may range from emergency to routine. Updated logistics information concerning materials, manifests, vendors, transports, delivery locations, and operating companies is available from the central database.

36 Claims, 14 Drawing Sheets

LOGISTICS SYSTEM AND METHOD

This application claims benefit of U.S. Provisional Application No. 60/119,378, filed Feb. 9, 1999, and U.S. Provisional Application No. 60/125,658 filed Mar. 22, 1999, and is a continuation-in-part of U.S. Application Ser. No. 09/317,388, filed May 24, 1998.

BACKGROUND OF THE INVENTION

1. Field of the Invention

The present invention relates generally to a logistics method for supplying a plurality of delivery locations using a plurality of supply transports and, more particularly, to logistics computer programming for monitoring, receiving updates, and automatically controlling logistics functions.

2. Description of the Background

When supplying many different types of materials to numerous delivery locations by means of transports, such as a plurality of supply boats, numerous time and cost inefficiencies can arise due to large numbers of requirements for routine and non-routine shipping. For instance, a manifest must be created that specifies the particular materials including quantities and types, the delivery locations to which each is to be delivered, preferably the location on the transport where stored, whether certain materials can be stored together, and handling of hazardous materials including necessary emergency information. Communications can be extremely complicated as many people need to know for various reasons the status of numerous different shipments. The requirements must be relayed to a base that can supply the materials or which must be ordered from numerous different vendors. Changes may need to be made in the manifest and the changes relayed to the base or location directly involved in the shipment process as well as to others indirectly involved such as accounting personnel. It is desirable to track the manifest through the delivery stages such as when the delivery is outstanding, when it is printed, when the materials are ready for loading at the base, when the materials are loaded or delivered and so forth. There may be time constraints depending on the priority of the delivery. It may be desirable to know when the transport has left the base and when the expected time of delivery at a particular location. The heading and position of the supply boats is desirable in real or near real time. Some supply boats may be able to carry the equipment and some may not due to space on the supply boat, geographical location of the supply boat, fuel levels, and so forth. The particular location of storage on the supply boat should be indicated so that an efficient load is provided to reduce costs. Some supply boats may be more efficient for certain cargos so the least cost supply boat should be selected for the manifested materials. The routing of the supply boats will affect the delivery cost and time so that has to be determined. Some materials cannot be stored together. Some materials are hazardous and require special information to be readily available along with special shipping needs.

Numerous other decisions and problems must be met and there is a need to provide efficient communication of all the requirements, changes, and status to different people at different geographic areas, delivery locations, transports, and bases so as to minimize cost while improving reliability. Consequently, there remains a need for a system and method for tracking, control, and logistics that may be effected with efficient communication and planning. Those skilled in the art have long sought and will appreciate the present invention which addresses these and other problems.

SUMMARY OF THE INVENTION

The present invention provides a means for keeping up with the numerous details, variations, problem handling, and communications involved in a logistics system.

For this purpose, a logistics method is provided for using a plurality of transports operating to supply a plurality of delivery locations from a plurality of bases by means of logistics computer programming. The method comprises steps such as providing the logistics computer programming for respective computers at the plurality of bases and at the plurality of delivery locations. A central database is provided for the respective computers and each of the respective computers operable for communication with the central database. The logistics computer programming is operable for providing updated logistics information to the central database from the respective computers. Preferably, automatic communication at selected intervals with the plurality of transports provides transport location intelligence. The transport location intelligence is preferably automatically stored in the central database. As well, transport information relating to each of the plurality of transports is stored in the central database. A list of materials is stored in the central database. This list is used to produce a manifest of manifested materials selected from the list for delivery to one or more of the plurality of delivery locations by one of the plurality of transports.

Preferably, the automatic communication provides transport latitude and longitude information and may also include heading and speed. The automatically obtained transport location intelligence may also include providing the fuel level for a respective transport.

The transport information includes factors about each transport such as cost/mile, daily cost, and storage space available. The logistics computer programming is operable for automatically selecting a transport and determining a least cost delivery route based on the cost/mile, the storage space available, and the manifest using a transport with the necessary capability. In one mode, an operator may manually select a transport listed in the logistics computer programming and automatically determine a most economical route for delivering the manifested materials using the selected transport. The programming automatically prices out associated deliveries of the manifested materials. A plurality of possible delivery routes are preferably provided for selection by the operator.

The manifest may be originated at one of the plurality of bases or one of the plurality of delivery locations. The central database is updated to include the manifest. The logistics computer programming associates a status with the manifest wherein the status preferably comprises a relationship to a shipment of materials in the manifest such that the shipment is outstanding, staged, printed, loaded, unloaded, or canceled.

The logistics computer programming preferably displays a main screen with a map that includes at least one base from the plurality of bases and selectable delivery locations assigned to the base from the plurality of delivery locations. As well, the programming associates each material with vendor information and stores the vendor information in the central database. Preferably the logistics computer programming stores interconnected tables at the central database related to the materials, the vendors, the plurality of delivery locations, and an operating company. The list of materials may associate a hazardous or a nonhazardous designation for each material. Association with each hazardous material may include a hazardous I.D., a DOT name, and an emergency number. As well, each material on the list of materials may be associated with a type of storage required. In fact, the computer logistics programming automatically selects the storage place on the transport although the selection can be changed.

The programming operates using a plurality of lists such as transport information relating to each of the plurality of transports in the central database with the transport information including factors such as daily cost and cost/mile information. A list of stored materials is used. As well, location intelligence in the central database related to each of the plurality of delivery locations is used along with a list of manifests in the central database relating to deliveries for the plurality of delivery locations.

In one embodiment, a monitoring system for use with a plurality of containers having cargo therein on behalf of a plurality of clients is provided that comprises a computer network server operable for communicating with a plurality of client computers. A database is operable for storing information relating to each of the containers and the cargo therein. A wireless communication device is associated with each of the plurality of containers for providing location intelligence for each of the containers. The location intelligence is stored in the database. The plurality of clients may access information from the database to determine location intelligence and a respective listing of cargo for each of the plurality of clients in the containers. Preferably, the computer network server is operable for communicating with the plurality of client computers over an Internet connection. The plurality of client computers is operable for producing a map showing thereon a geographic picture of one or more containers. Each of the plurality of client computers is operable for selectively communicating with one or more of the plurality of containers with which the client is associated. In one embodiment, the container may include receiving apparatus for producing a signal in response to a communication from a respective client for effecting a purpose such as remote control or the like.

Therefore, it is an object of the present invention to provide an improved logistics system.

Another object of the present invention is to provide a device for controlling costs associated with logistics.

Yet another object of the present invention is to provide a system that is operable at a substantially reduced cost.

Yet another preferred object of the present invention is to provide a system that is accessible as necessary even from remote portions of the world.

The above objects, features, and advantages are not to be construed as limiting the invention in any way but are provided merely as an aid in understanding the ramifications of the invention with respect to presently preferred embodiments of the invention. Moreover, these and yet other diverse objects, features, and advantages of the present invention will become apparent from the drawings, the descriptions given herein, and the appended claims.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

BRIEF DESCRIPTION OF THE PREFERRED EMBODIMENTS

The present invention relates mainly to logistics programming that is used to organize communications between a wide range of different operators so as to effect deliveries at a plurality of delivery locations, from a plurality of bases, using a plurality of transports. While preferably a single program is used, the program could conceivably be operated in different modules. The preferred approach uses a single program that preferably functions somewhat differently depending on whether it is installed at a base location, a delivery location, or a transport. U.S. Provisional Application No. 60/119,378, filed Feb. 9, 1999, U.S. Provisional Application No. 60/125,658, filed Mar. 22, 1999, and U.S. application Ser. No. 09/317,388, filed May 24, 1998, are hereby incorporated herein by reference.

FIG. 1-6 disclose an exemplary system and apparatus that could be used in connection with the logistics method of the present invention for many purposes, such as for tracking the location of a particular container in a shipment, and so are discussed herein and were part of U.S. application Ser. No. 09/317,388 filed May 24, 1998. FIG. 7-14 provide a more specific overview of the invention of the present application.

Figure 1:
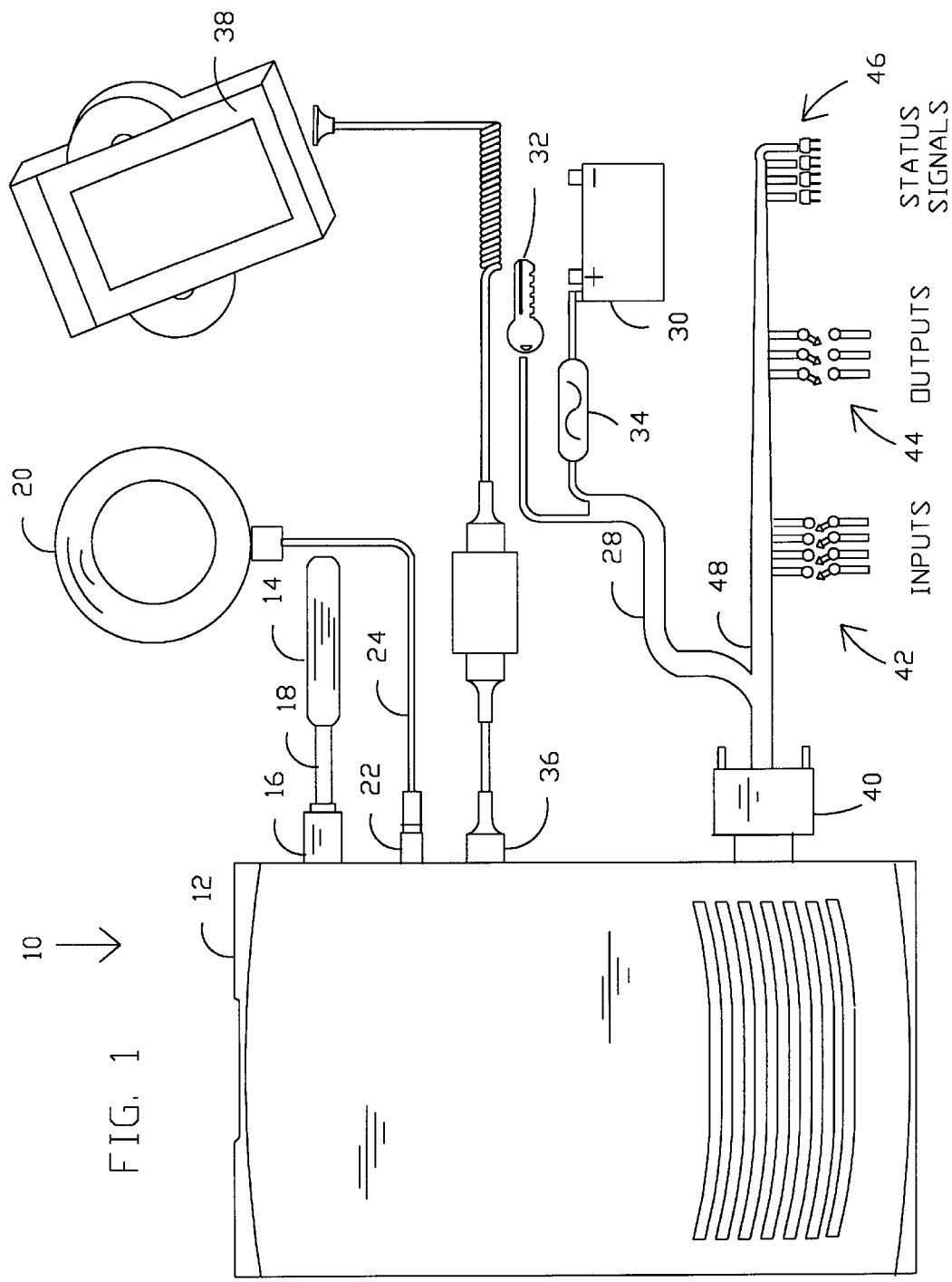
FIG. 1 is a pictorial diagram for a monitoring device that may be used with the present invention.

Referring now to the drawings, and more particularly to FIG. 1, there is shown a physical representation of monitoring device 10 in accord with the present invention and various attachments that might be used with various items to be monitored. Such items are referred to herein generally as targets that are assets of some type which are desirably monitored. It will be noted that FIG. 5 discloses a block diagram of the electronics of monitoring device 10 and FIG. 4 discloses a flow diagram for software used in monitoring device 10.

Enclosure 12 is a relatively small housing that may be conveniently mounted for operation. While the attachments to monitoring device 10 are suitable for use with a vehicle, monitoring device 10 may be used with many targets such as assets to be monitored including mobile vehicles such as cars, trucks, ships and/or cargo or assets that may be transported. The monitoring device may also be used with fixed objects such as utility meters, houses, various systems as a remote control unit, and other such functions. There is really no limitation on the types of targets/assets with which monitoring device 10 may be used. For instance, monitoring device 10 might be used for tracking bicycle messengers or even be used for tracking people. The low cost of the service for wireless communication and low cost of the monitoring device 10 allow wide use of the device where cost and size effectively prohibited widespread monitoring usage in the past. The reasons for the low costs will be explained and become apparent as the components of the system are disclosed and discussed hereinafter.

Pager antenna 14 is provided with an appropriate connection 16 and antenna cable 18 of suitable length for the intended application. Global positioning sensor (GPS) antenna 20 is attached at connection 22 to monitoring device 10 via cable 24. Preferably the antennas 14 and 20 are mounted such that they do not interfere with each other and so the reception is maximized. Various pager and GPS type antennas could be used with monitoring device 10.

Cable 28 is used to connect the unit to power. While the type of connection will depend on the application, it will be noted that where necessary for security purposes, monitoring device 10 can be connected to power in such a way that it will be difficult to operate the vehicle if monitoring device 10 is disconnected or otherwise damaged. Various types of labyrinth wiring possibilities for connecting to the ignition system are well known that make it difficult or impossible for operation of a vehicle without rewiring of the ignition system, typically a time-consuming project even for a skilled mechanic. If that type of security is not necessary, then such connections are not required.

Monitoring device 10 may be connected to battery power 30 of a vehicle, or other asset to be monitored, in several different ways. For instance, power to monitoring device 10 may be of two types including battery power 30 and ignition power 32. With this power option, some circuits are unpowered and others that draw little power continue to be powered to maintain the settings. For instance, the global positioning sensor (GPS) may be of the type that permits a low power-on function to prevent the need for initialization of the GPS as may typically be required after all power is turned off to the GPS. The GPS initialization process may otherwise typically take in the range of about 90 seconds to be completed before a position fix may be taken. Another power option is simply to leave all circuits of monitoring device 10 connected to battery 30. This option might slowly drain battery 30 but because the monitoring device 10 draws very little power, this will not normally be a problem unless battery 10 is not charged for extended periods. It will also be noted that monitoring device 10 may be programmed to control power itself as discussed subsequently so as to further reduce power usage. Another power option is to connect monitoring device 10 directly to ignition 32 so that power is applied only when the ignition is on. As discussed above, this will typically require an initialization of the GPS and a delay before location fixes can be taken. Other options may also be used. For instance, in some applications it might be desirable to include a battery within monitoring device 10 for various reasons such as to provide emergency power and/or perhaps provide notification of battery power outage, impending battery outage, or other power outage. It will be understood that other types of power such as AC power could possibly be used where desired with suitable converters or that monitoring device 10 may be provided with means for handling AC power. Fuse 34 or other suitable protection means is preferably used for protecting both monitoring device 10 and any circuits to which it is attached.

Computer port 36, which is preferably an RS-232 port, is provided for connecting computer 38 to monitoring device 10. This is an optional connection but will be convenient for use with portable computers. As monitoring device 10 includes a low-cost pager modem, there is no need to provide a much more expensive modem with computer 38. Also, because a pager network is used with monitoring device 10, costs for usage are kept much lower as compared with cellular telephone networks. Computer 38 may be also be used in connection with monitoring device 10 for debugging and other functions such as downloading recorded information. Computer 38 may also be used for E-mail, Internet connections, messaging, and other purposes as desired.

Figure 2:
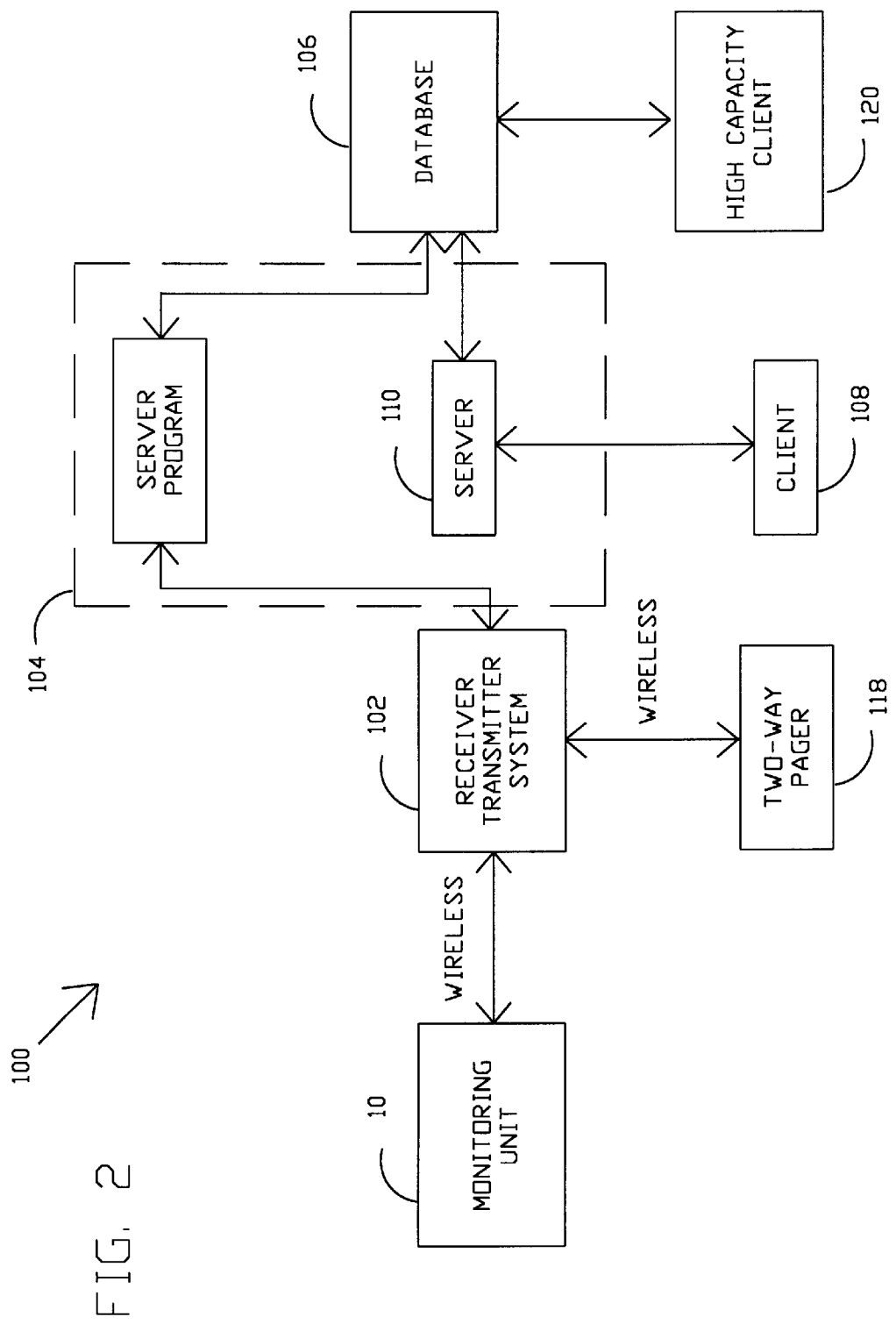
FIG. 2 is a block diagram of a system for monitoring a plurality of targets that may be used in accord with the present invention.
Figure 3:
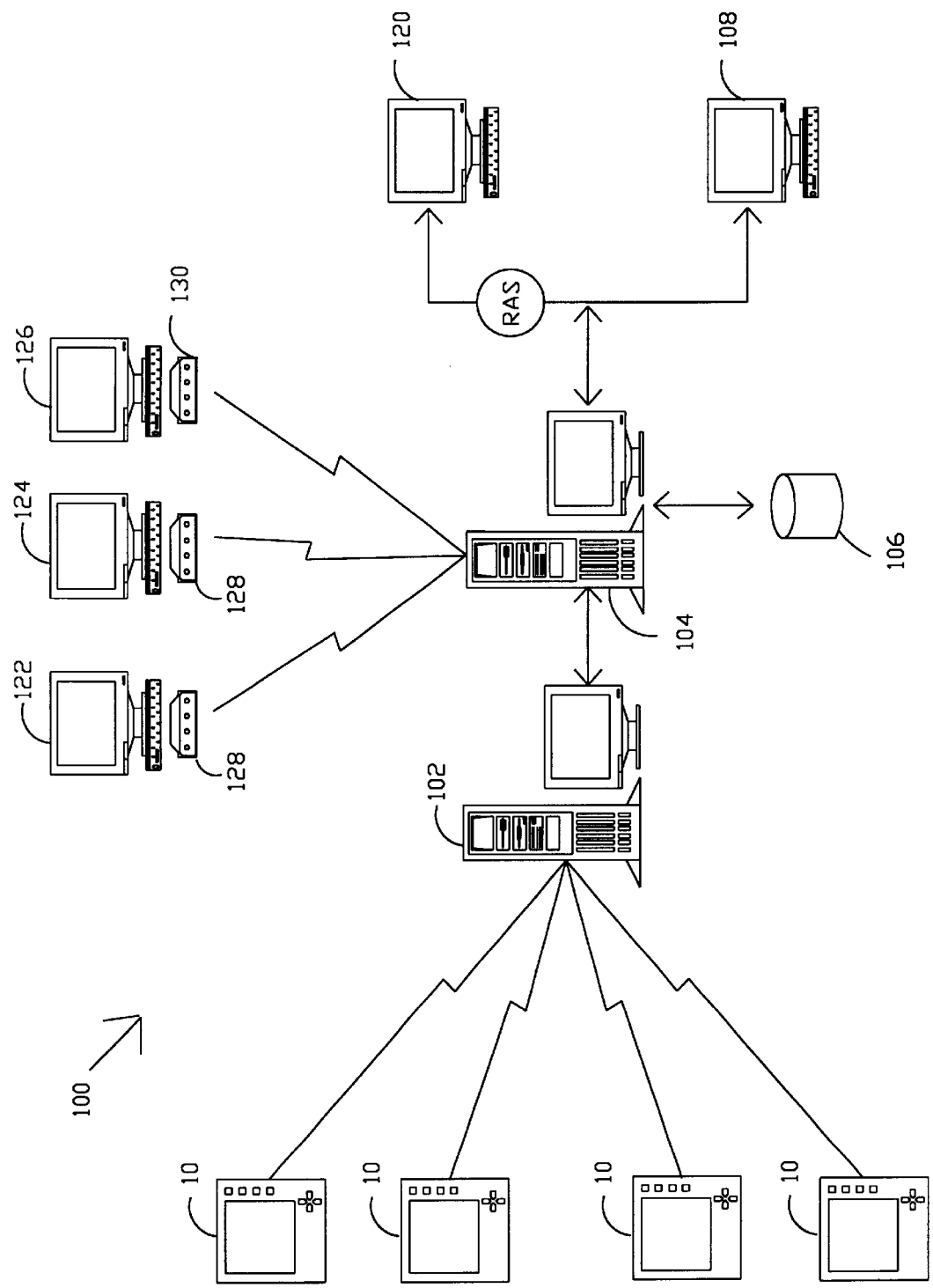
FIG. 3 is a pictorial schematic for a system for monitoring a plurality of targets that may be used in accord with the present invention.

Digital I/O or interface 40 connects inputs 42, outputs 44, and status signals 46 to monitoring device 10 preferably via cabling 48. Inputs 42 may include up to four switches, buttons, or sensors. In another embodiment, sixteen inputs or variations might be used where each of the four inputs represents a digital number. It will be noted that because monitoring device 10 is preferably used with system 100 as shown in FIG. 2 or FIG. 3, that inputs for any particular monitoring device 10 may be different, e.g., if there are one thousand monitoring devices 10 in operation, each device may be configured differently. The flexibility comes because during initialization of monitoring device 10, the various inputs 42 and outputs 44 are listed and entered into a database of system 100 where they are defined along with any desired response that a client may wish system 100 to make, e.g., email, telephone call, pager alarm, etc. Inputs to monitoring device 10 for use with a vehicle may include, for example only, a panic button, air bag deployment, siren, lights, auxiliary signals, cargo door sensor (open/close), or a threshold indicator such as cargo temperature exceeds a threshold.

Figure 6:
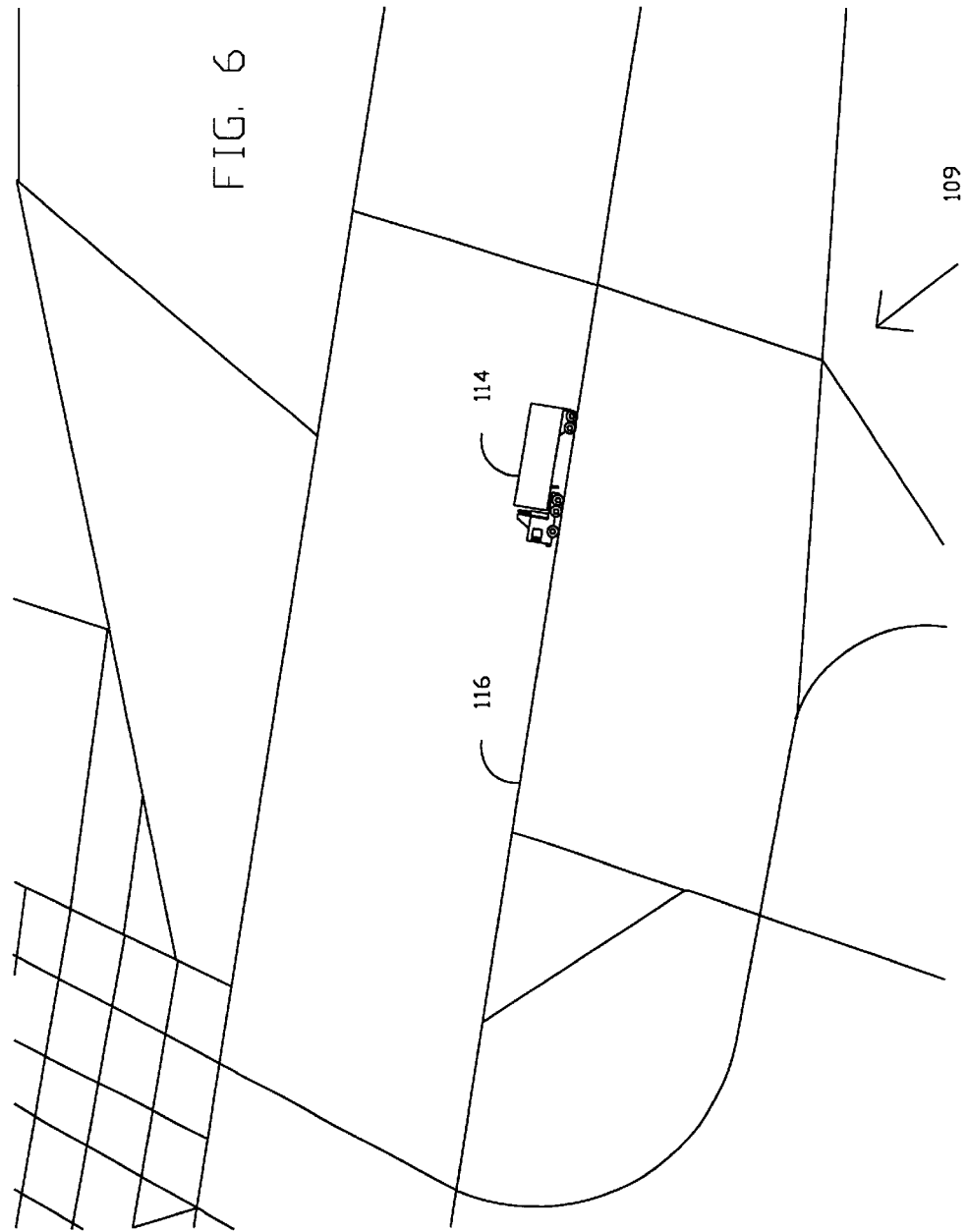
FIG. 6 is a pictorial diagram representative of a client computer screen showing a location of the client's target, in this case a vehicle, on a map generated by a computer that may be used in accord with the present invention.

If desired, certain events, e.g., a door opening, may trigger a data reporting signal. For instance, the location of a vehicle could be determined and transmitted each time a door opens. In such a case, the door opening would be programmed into system 100 with a request to check and store location intelligence. Then, each time the door opened, monitoring device 10 would transmit this event to system 100, system 100 would request location intelligence from monitoring device 10 and store the information in a database. That information would then be available to the client who would be able to access database information, perhaps with a map as shown in FIG. 6, and as discussed subsequently. As another example, system 100 might be initialized such that an input is designated as an air bag with an emergency response being set up for whenever the air bag deploys, system 100 could be programmed to request location information from monitoring device 10 if the air bag deploys and then automatically request emergency service by providing the location information to police and ambulance services in the area where the air bag deployed.

Where a large number of units were to be the same, it would be possible to program monitoring device 10 to collect or log information in its own memory. For specific use in data logging, monitoring device 10 would not necessarily even need the pager and pager modem for collecting location information responsive to a trigger signal to reduce the cost of monitoring device 10 even more. Downloading to a computer, such as computer 38 could be accomplished at an appropriate time such as the end of the shift or day, for each vehicle, to determine, for example, routes and for optimization thereof.

Monitoring device 10 may be used to produce outputs such as door locks, ignition kill, to produce an audible alarm for the driver, or to effect any other feature that can be electrically interfaced to monitoring device 10. While FIG. 1 indicates up to three outputs, additional outputs may be obtained by using lines that otherwise provide status signals 46 as outputs. If necessary, a digital circuit could conceivably be used to produce up to 16 different outputs based on using the same four output lines to provide a code. Thus, numerous different outputs may be used. Moreover, system 100 can remotely control the outputs. Thus, a client who logs onto system 100 through the Internet, and who may be in another country, can effect a desired output through monitoring device 10. Status signals 46 may typically include LED indicators to show power on, battery 30 is ok, communication is in progress, GPS is obtaining a fix, and the like. Other status signals could also be used, if desired.

Some uses of the above components may be illustrative. For instance, finance companies may be more likely to finance auto purchase for individuals with less than perfect credit because with monitoring device 10 installed, they will be able to assure proper asset protection and recovery of the asset with the currently costly locating and repossession processes. As another example, when an automobile reseller places the unit in a car, then on a daily or even hourly basis the reseller can assure the location of all of the vehicles each day. The dealer can also disable, secure, and set alarms on all of their vehicles at the end of each day by a single computer command from their computer. This same process can activate all units with a single command the next morning and inform the dealer of problems with any car, such as low battery. The dealer can assign a range that their cars are not authorized to depart from, say a five-mile radius about the lot, and if any car does leave this limited area, the dealership can be notified by system 100 along with law enforcement officials. The automobile can be tracked and when it is stopped, the automobile can be deactivated and the dealer notified of the location. When sold, the unit costs could be passed by agreement to the purchaser because the purchaser can get a lower finance rate by allowing the finance organization the right to send messages pertaining to payment status and to deactivate the automobile if contract requirements are not being met. The finance company benefits because cost for collection agencies and wrecker services is reduced or eliminated. When the finance company is ready to pick up the deactivated auto, they will know the exact location. They can send someone to pick up the car, have it activated, open the doors, and so forth. If a two-way pager is used, for instance as discussed hereinafter, the person to pick up the car can open the doors by sending a signal with the two-way pager. For the automobile owner, the options are very broad. The location of the vehicle is known, it can be tracked, the alarm can be activated, lights flashed, or when the car is stopped it can be activated and law enforcement can be notified of the location. Turn by turn directions, road side assistance, and the like are available. When traveling across the country, monitoring unit 10 will automatically reacquire when it enters a new service area and system 100 will be notified of the location anywhere in the United States the unit is operated.

While system 100 can easily be programmed during initialization to activate the outputs in a desired manner, monitoring unit 10 may also be programmed for operating desired outputs upon the occurrence of an event if desired as may typically occur when a large number of vehicles or other targets are desired to be wired in a similar way. For instance, it may be desired that upon air bag deployment, monitoring unit 10 automatically sends location information without the need for a request to do so from system 100.

Figure 4:
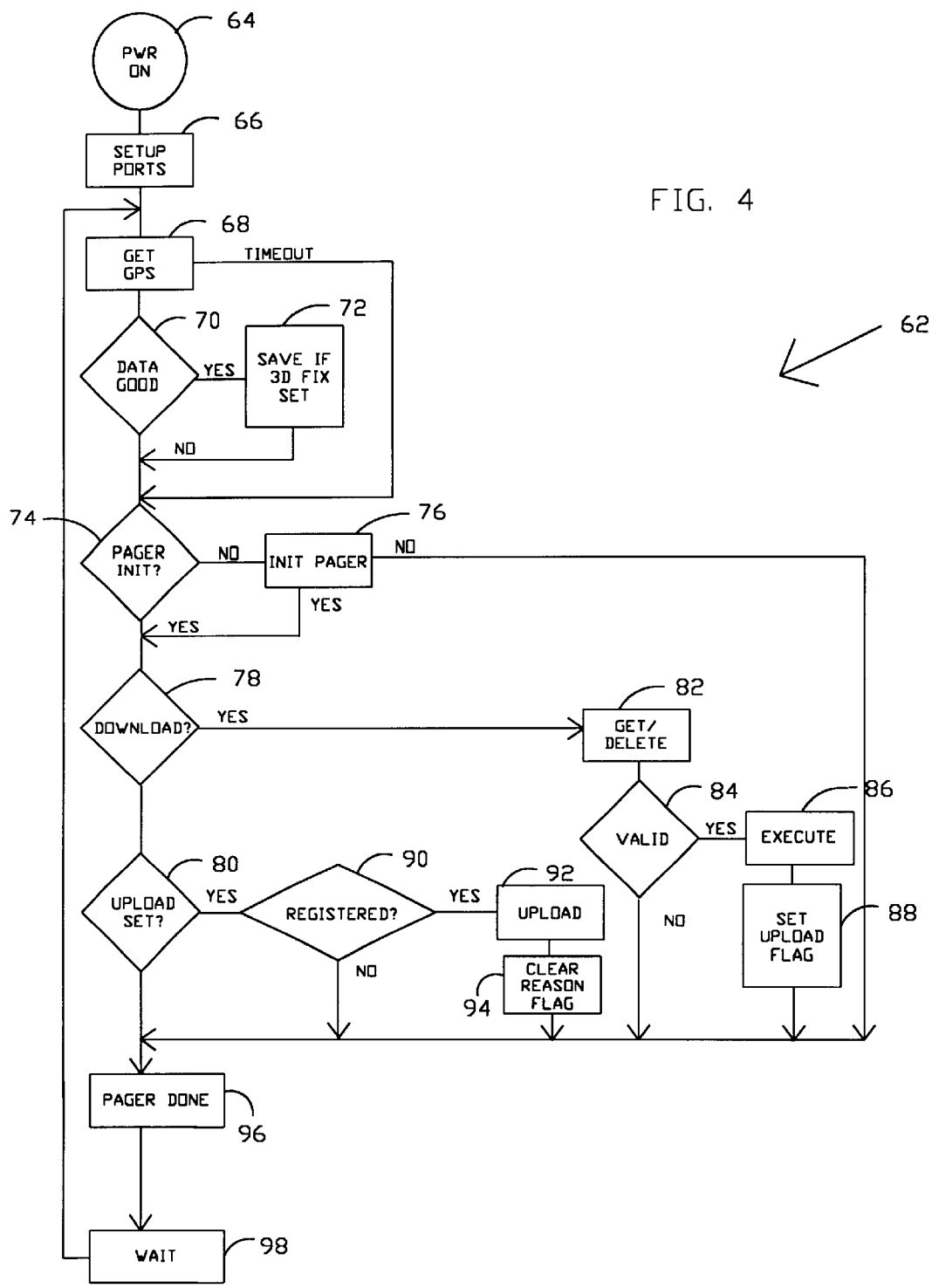
FIG. 4 is a flow diagram of programming control for a microcontroller for use in a monitoring device that may be used in accord with the present invention.
Figure 5:
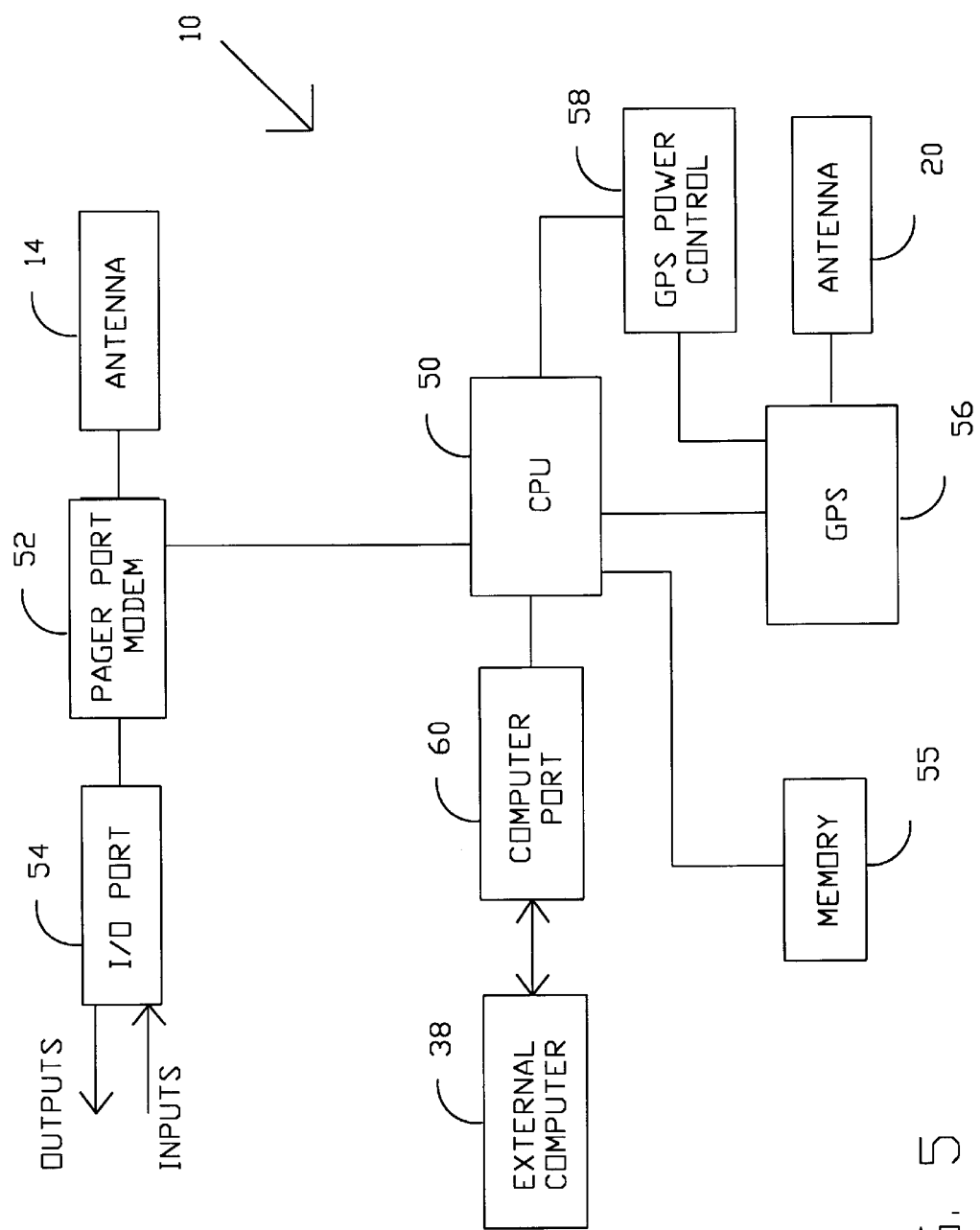
FIG. 5 is a block diagram of a monitoring device that may be used in accord with the present invention.

FIG. 5 provides a block diagram of the circuitry of monitoring unit 10 an FIG. 4 provides a flow diagram of software for monitoring unit 10. One reason for the very low cost of monitoring unit 10 is the use of microcontroller 50 as the means for operating monitoring unit 10. While microcontrollers require programming in a low-level language that is closely related to the architecture of the chip, the cost of a microcontroller is much less than an embedded computer system that would allow programming in a high-level language useable with many different computers. Once programmed, the low cost of the microcontroller greatly reduces overall costs of monitoring unit 10 and additional units may simply copy the same program into the microcontroller memory. In larger quantities, a microcontroller as used may cost in the range of $2 each which is many times less expensive than even the lowest cost embedded computer systems. In a presently preferred embodiment, monitoring unit 10 uses a PIC16 microcontroller chip. The traditional definition of a microcontroller is that of a processing engine with program ROM on the chip. The presently preferred embodiment microcontroller 50 has about 1000 bytes of ROM and also has a small amount of RAM which is less than 100 bytes. In this particular model, the chip does not have a port to read the program out so for security reasons, the program is protected. One of the functions provided by microcontroller 50 is to provide information in the correct format to the pager port modem interface 52. To save costs, this approach is used so there is no need to change the interface hardware/software between the modem and pager but rather microcontroller 50 operates the modem to provide information in a format accepted by the pager and pager/modem interface hardware/software. Thus, this approach provides another significant development cost savings.

The use of a pager with a pager modem is also much less expensive than the use of a cellular telephone with a modem. Therefore, equipment costs are greatly reduced. Furthermore, air time cost is also greatly reduced as pager air time costs much less than cellular telephone air time. Item 52 includes the pager/modem/port connections as well as the interface between the pager and port that is preferably commercially obtained and left unmodified as discussed above so as to remain in compliance with FCC regulations without the need for retesting, modification, and so forth.

Using these formats rather than attempting to modify this equipment is considered a significant cost savings of the presently preferred embodiment although these items could be modified, if desired. In a presently preferred embodiment, pager port/modem 52 has inputs and outputs to form I/O port 54 built in, as has only recently become commercially available, thereby saving additional costs of providing the I/O port directly from microcontroller 50 as could also be provided. Moreover, by eliminating input/output circuitry driven directly by microcontroller 50, component costs are reduced further. It is also possible to provide additional memory 55 which is preferably nonvolatile RAM such as an EEPROM to give greater flexibility of operation for monitoring unit 10. Memory 55 may be used to store events, for logging purposes, and generally provides much more flexibility of operation for monitoring unit 10.

As presently preferred, I/O port 54 is operated indirectly by microcontroller 50 through pager port 52 rather than directly. It will be noted as discussed subsequently that events that occur, i.e., signals from the target, are transmitted according to the programming of microcontroller 50. As explained subsequently, this procedure reduces air time costs. Preferably, at least two outputs of I/O port 54 have sufficient current for driving relays so as to control larger current devices. If required, driver circuits could be added as desired to effect more output control circuits. As discussed earlier, digital units with driver circuits could be added to the presently preferred embodiment of monitoring unit 10 to control sixteen outputs and/or receive sixteen inputs. The outputs and inputs are electrical signals that are used with the target and are related to the type of target and may include a wide range of signals. Microcontroller 50 presently handles on/off types of signals rather than analog signals so as to keep costs low, digitized analog signals could conceivably be used through computer port 60.

Pager antenna 14 and GPS antenna 20 are connected to pager/modem 52 and GPS 56 as indicated. Global position sensor or GPS 56 preferably supports both standard and differential position information. GPS 56 communicates with microcontroller/CPU 50 and provides location information whenever requested. To save power, microcontroller 50 can place GPS 56 in an idle position by means of GPS power control 58 until a GPS signal is requested by microcontroller 50, which in turn may have been requested from system 100 through pager/modem/pager port 52. Power control may be effected by a mosfet or other switching device as desired for low cost and reliable operation.

Computer port 60 is preferably an RS-232 port that provides the correct voltage levels, connectors, and so forth for compatibility with an external computer, such as external computer 38, discussed hereinbefore.

Typical operation of monitoring unit 10 may be described in terms of microcontroller 50 programming as per flow diagram 62. At the time monitoring unit 10 is powered on as indicated at 64, the unit begins to operate as per the flow diagram. Since the program information is stored in ROM in microcontroller 50 and any information saved in nonvolatile RAM memory 55, all memory information is readily available when power is turned on and is not lost with loss of power. Therefore, disconnection of the car battery for replacement or other reasons for loss of power does not alter operation of monitoring unit 10 once power is restored.

If monitoring unit 10 has just been installed, then it is necessary to initialize the ports as indicated at 66. Initialization essentially requires notifying system 100 what each port is connected to, what the desired response is for any signal from the ports, and whatever requirements the client may have which information is typically stored in the database of system 100 as discussed subsequently. This may be accomplished with a form that is filled out and provided to system 100. For instance, the form may ask what each input line is connected to, e.g., line one to an air bag sensor, line two to a battery indicator, etc. Then a response for system 100 may be provided for each such event. Likewise the outputs are listed, e.g., output line one to alarm, output line two to door locks, output line three to an engine kill, etc. In this way, system 100 and/or the client can operate each of these items remotely. The client has the option to change or modify responses to signals as desired.

At item 68 in the flow diagram of FIG. 4, microcontroller 50 sends a command to GPS 56 to provide GPS location data that is indicative of the position at which monitoring unit 10 is located. Depending on the particular mode of operation and programming, this may also require turning GPS power on as indicated at 58 so that GPS 56 is no longer in an idle mode. Upon power up to monitoring unit 10 where power has been completely removed, it may take from one to several minutes to obtain a reading from GPS 56. If a GPS signal is not obtained within a certain time period, or if the GPS is removed (see discussion above on operating monitoring unit 10 without the GPS for stationary objects), then a timeout condition occurs and operation continues as indicated by flow diagram 62. A typical time period might be about three seconds but could vary depending on the type of GPS or as desired.

Assuming GPS 56 provides location data to microcontroller 50, then the location data is checked using a checksum method or other data checking means as indicated at 70. If the location data is determined to be valid, then the location data information is saved at 72 assuming it is desired to save the location data. Thus, a flag may be set that determines whether or not to save the location data and may typically be set in response to a signal from system 100. The location data may be logged if desired into memory such as memory 55 if it is desired to save a series of location data. While system 100 can effect logging on any time schedule or in response to events that may occur with respect to inputs, monitoring unit 10 may also be programmed to log data into memory 55 such as events, location data, output signals, and the like.

Upon completion of the above described data collection sequence, the GPS portion of the signal is completed until the next cycle of the program. At this time, microcontroller 50 checks as indicated at 74 to see if the pager (which is considered part of pager port/modem indicated at 52) has been initialized. It is necessary to initialize the pager upon the first program cycle after installation of the unit. After the first program cycle, the necessary initialization information is stored in nonvolatile memory and a flag is set so that the program would skip this and go to the next step. Initialization occurs at step 76 and may include, for instance, determining that pin numbers for the pager in port/pager/modem 52 and for monitoring unit 10 are established for setting up the pager network and setting forth where messages from each monitoring unit 10 or group of monitoring units 10 are stored. Thus, this step includes the steps that are typically required for the preferred two-way pager operation. As well, the inputs and outputs may be checked to insure they are operational. External computer 38 may be used via computer port 60 to aid in set up or to change programming if desired. Once initialization is successfully accomplished, a flag is set to the effect the pager has been initialized and this process need not be repeated. If initialization fails for some reason, or is incomplete, then the program proceeds to the end and loops back to start again.

Assuming the initialization flag is set, then microcontroller 50 checks to see if flags are set for new messages from system 100, and if so, then the messages are downloaded as indicated at 78. To save costs on air time, all the messages are preferably executed prior to uploading or transmitting at 80 so that all upload messages can be sent at the same time. If there is a message from system 100, then it is downloaded and the message is deleted from the list or queue of messages if there is more than one message waiting. Assuming the message makes a valid request or one that is in line with initialization criteria as indicated 84, then the message is executed at 86. An example might be a message from system 100 to send location data. In that case, at this time microcontroller would proceed according to programming to poll GPS 56 to obtain an update of the location. As another example, system 100 might send a message that has the effect of unlocking the doors of a vehicle. In this case, microcontroller 50 would contact pager port 52 and activate the appropriate output. System 100 would have the information as to which output to activate and the message would specify that output. If the message requires an upload, then the upload flag is set as indicated at 88.

Assuming all downloads are complete, then as indicated at 80 a check is made as to whether the upload flag is set. The flag can be set in several ways. The upload flag may be set if any of the inputs have been activated. Programming could also provide for setting the flag at a time interval. If one or more inputs such as an air bag deployment, alarm, high temperature, or other inputs occur, then the flag may be set. As well, an upload flag may have been set as discussed at 88. A check is made that the unit initialization is registered at 90 and then an upload or transmission as indicated at 92 is made. Thus, for an upload, microcontroller 50 would encode the upload message into a format that is acceptable by the modem/pager interface through a connection in the pager port 52. The pager of port 52 transmits the message according to pager network protocol with any standard checks to ensure accurate transmission. After transmission, the reason flag for that particular upload is then reset after transmission as indicated at 94. At this point in the program, the pager section of the program is complete as indicated at 96. A delay or wait state is implemented at 98 which is typically only a short duration.

As discussed above, microcontroller 50 uses a low level language for implementation and does not have sufficient memory or a compiler to allow it use of a high level language. By high level is meant a language that is transferrable between different types of computers such as FORTRAN, C, or the like. Low level languages, which may include machine language, are dependent upon the particular architecture of a particular processing system and so are not typically transferrable from one machine to another unless the machines are intentionally made to be compatible. Use of low level language is more time consuming for the initial programming, but because the same program can be used in many monitoring units 10, the hardware to process a low level language is less expensive, and the overall result is a very low per unit cost when sold in volume. Moreover, low level language often executes more quickly than higher level languages and memory is used much more efficiently.

Referring now to FIG. 2 and FIG. 3, system 100 is presented in two different ways so as to provide a more complete description thereof and to show more fully the various possible interconnections. In FIG. 2, a basic block diagram of components is disclosed.

Monitoring unit 10 has been described hereinbefore in some detail and it will be understood that system 100 may work with large numbers of such units that may be operating throughout the United States and, in fact, may be located anywhere worldwide. Each monitoring unit 10 communicates with one or more pager networks 102 by wireless transmission means. In the U.S., the F.C.C. assigns a frequency band for this type of communication and pager network 102 acts to transmit and receive messages. Pin numbers are used to verify authorization, to determine with which unit 10 communication takes place, and where to store messages. It will be understood that a pager network will have an infrastructure that includes numerous different antennas in order to cover a wide area and may typically include most, if not all, of the area of interest such as the U.S. or another country. Anywhere in the world a pager would work, then monitoring unit 10 can also communicate. System 100 may include more than one pager network and retains the necessary information to communicate with monitoring unit 10 through different regions and within different pager network systems.

A connection is provided between pager network 102 and server 104 that may include a direct connection or a connection over a network such as an Internet connection. It will be understood that one or more servers may be used for operation of system 100. Server 104 operates with database 106 which, in a presently preferred embodiment, is an Oracle™ database. In the database, the information for operation of system 100 with each monitoring unit 10 is stored. For instance, for each particular monitoring unit 10, database 106 stores the relevant inputs and outputs, client specifications regarding inputs and outputs, client messages and types of messages in response to signals, and so forth. For instance, data in database 106 may be included to monitor location at a particular time interval, monitor whether the location goes outside of a defined area such as a car leaving an area of town, send a notification to the appropriate client by the client's desired communication means, and so forth. Database 106 may include a wide variety of information such as contact numbers, emergency numbers for different regions, and the like so as to be able to offer a wide array of possible types of communication including even partially non-automated communications such as notification to an operator to contact a client by telephone, radio, or the like. Automatic communications may include e-mail messages, pager messages, telephone messages, fax messages, and others including any automated means of communication.

In a preferred embodiment, database 106 also includes a table or list of messages to be sent and a table of incoming messages which are operated on. Once operated on, the messages may be saved for as long as the client desires to keep track of communications that have occurred. A client may send one command that affects all his targets. For instance, a car sales outlet might send a single message to all vehicles to lock the doors and turn on the burglar alarm.

To illustrate a typical operation, numerous different clients such as client 108 may log onto system 100 over the Internet, through a modem connection, or other connection. Client 108 does not need to have a computer and may simply call an operator by telephone, radio, two-way pager or other communication means. At any rate, client 108 contacts system 106 to request information, in response to a message from system 100, to send a command to one or more monitoring units 10, or for other such reasons. For instance, assume client 106 has four vehicles that are being monitored and supplies the appropriate identification number. He may then wish to know the whereabouts of each vehicle. This request may be received by network or Internet connection 110 of server 104. Server 104 contacts database 106, perhaps using an Internet connection or other connection, and database 106 places the message on a table of outgoing messages. In a presently preferred embodiment, a dedicated server program such as server program 112 controls all messaging between transmitter/receiver network 102 and database 106. Therefore, server program 112 takes the message from the table of outgoing messages in database 106, and sends the message to transmitter 106 with the correct pin numbers for identification of the particular four monitoring units to be contacted. The message is then sent out and, due to the identification numbers, the appropriate four monitoring units 10 respond to the request, as discussed above. Thus, the monitoring units 10 provide updated location information that is received by receiver/transmitter system 102. Server program 112 takes these messages from the pin data storage location and sends them to database 106 where they are placed in the table of incoming messages. The client has requested the results sent to him, so the information goes to server 110 and then to client 108. Client 108 may view the information in different ways. For instance, in accord with the present invention, Client 108 may preferably use a program having a screen with a map such as shown in FIG. 6 whereupon one or more vehicles 114 may be shown on the particular street 116 within the map section 109 that is selected for viewing. The client may track the path of vehicles using different symbols and the like as desired. The present invention provides a mapping system and program for tracking, labeling, and monitoring so that assets being sent by different types of transport vehicles such as ships, trains, trucks, helicopters and the like can be tracked and reference is made to U.S. Provisional Application No. 60/119,378 filed Feb. 9, 1999 and U.S. Provisional Application No. 60/125,658 filed Mar. 22, 1999 wherein such programming is described in detail and was previously incorporated herein by reference.

System 100 may also be used for monitoring fixed assets such as for utility meter readings, home monitoring, and the like both in an active and passive role. In fact, it may be more desirable to monitor a home by a radio link rather than by a telephone connection as the telephone connection is readily cut or otherwise disabled whereas a radio link is typically be more difficult to detect and disable especially if the antenna is hidden. System 100 also contemplates communication using, for instance, a two-way pager such as two-way pager 118. The pager communicates with server 104 through pager network 102 to thereby send a message to monitoring unit 10. As well, database 106 may be programmed notify two-way pager 102 in response to a message from monitoring unit 10. Thus, using a two-way pager it is possible to stand next to a vehicle and if monitoring unit 10 is appropriately wired, then opening the doors, starting the engine, etc., using a two-way pager.

High capacity clients as indicated at 120 may preferably have a direct connection to database 106. This would allow large clients to monitor, track, and so forth a large number of assets at high speeds. For instance, a utility company checking meters may need to check a large number of meters each day and would preferably have a high speed connection. The connection may be of different types including local area networks, remote via modem connections, and so forth.

System 100 is also operable for communication with other types of transmission as may occur from cargo carriers of all types such as vessels or destinations with respective communication means 122, 124, and 126. Typical examples might include offshore oil platforms that receive cargo, ships carrying cargo, supply ports and so forth. Communication may be derived with different systems such as through packet radio modems 128 or satellite communication transceiver 130. The system of the present invention can track cargo, print manifests, be used for ordering products, list suppliers, and display cargo location on a desired map. Thus, the present system, apparatus, and methods may be used for a wide variety of tracking, monitoring, and logistics purposes.

Figure 7:
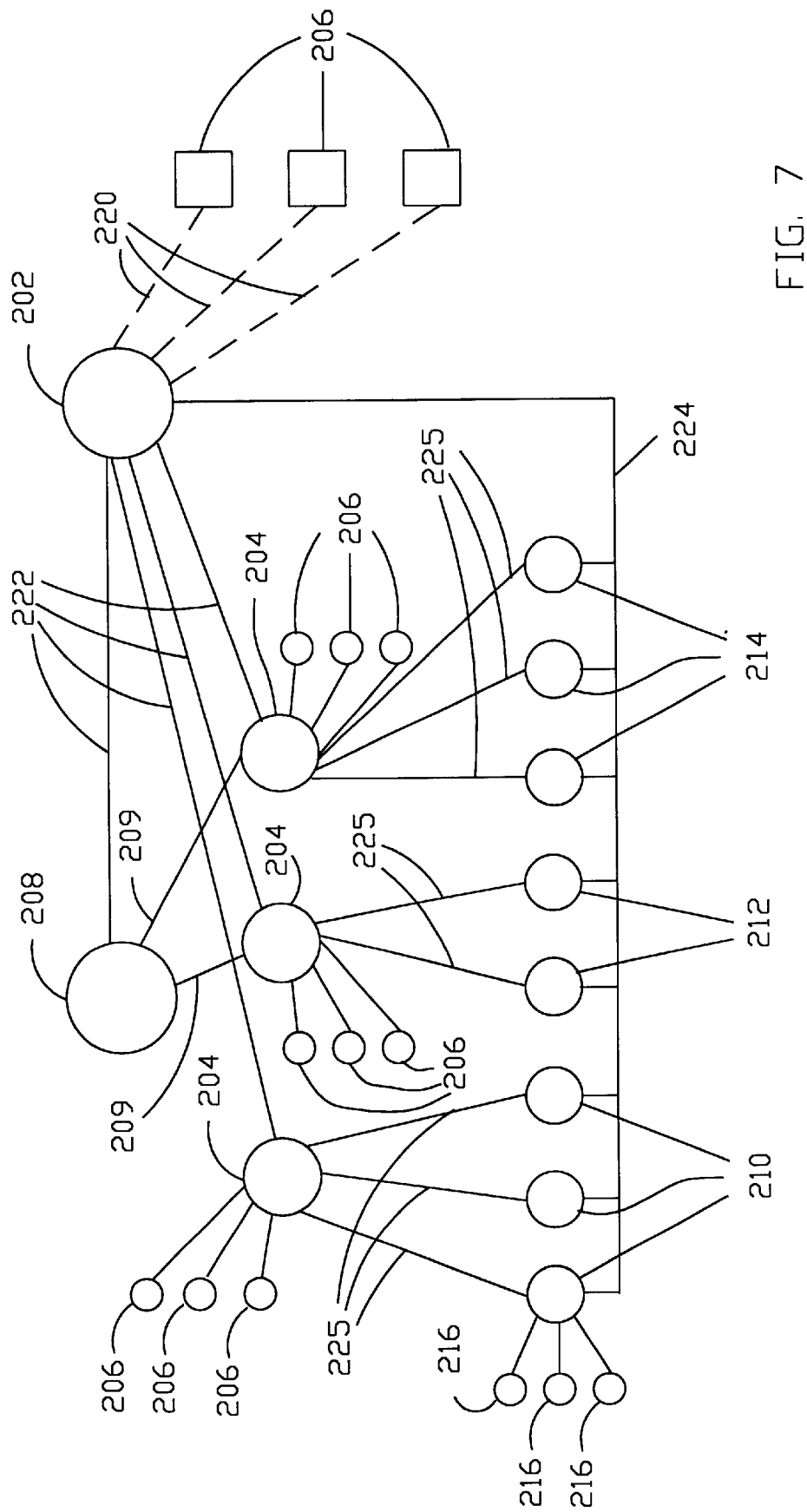
FIG. 7 is a schematic diagram representative of numerous delivery locations, bases, and transports that each connect to a central database.

FIG. 7 illustrates communication flow path 200, which might be a typical configuration of communication lines in a preferred embodiment of the present invention. Central database 202, which is preferably an Oracle® database located on the Internet, is kept updated during the logistics process. Thus, all interested parties can check with central database 202 for determining the most updated logistics information. The supply system may include a plurality of supply bases, such as supply bases 204. Each supply base is in communication with database 204 by some means such as an Internet connection or other communication line. Each supply base has numerous approved vendors that supply materials. The vendors are indicated as elements 206. The bases preferably contact the vendors directly. In some cases, a central office 208 may need to be able to access central database 202 to monitor shipments and check daily shipping costs. In some cases, the central supply office may also serve as a base for one or more bases as indicated by lines 209. Locations 210, 212, and 214 are assigned to different bases as indicated above for supply purposes. Locations may be assigned and unassigned as discussed hereinafter. In some cases, delivery locations serve as supply bases for other delivery locations. For instance, delivery locations 216 are served by one of the delivery locations 210. Thus, material may be directed for delivery to and delivery from a location and the logistics computer program of the present invention handles such transactions. Transports 218, such as supply boats, are used to deliver cargo to the delivery locations from the bases. They may be of different types and sizes so as to result in different delivery uses depending on various factors such as utilization, the weight or size of the delivery, and the like. The logistics program of the present invention is operable for storing information concerning the transports and determining which transport is most suitable for least cost delivery of a particular manifest. By manifest is meant a list of cargo or persons on a transport such as a boat, helicopter, train, plane, of freight truck. While the present invention is described in terms of a supply boat system, it may also be adapted for use with other types of transport. Communication of information relating to transports 218 is typically wireless as indicated by communication lines 220. Communication may be by radio, satellite communication, where possible by a pager system as discussed hereinbefore, or by other means. Generally the wireless communications will be received by a system such as system 100 and transferred to a central database such as database 202 or database 106 as shown in FIG. 2 and FIG. 3 and discussed hereinbefore. Communication lines 222 between the bases and database, which are normally land based, may be preferably be Internet connections. Communication line 224 may be by radio or other line and may also be directed through the bases rather than with a direct line to central database 202. If desired, communication lines 225 could be used whereupon a connection to central database 202 could be provided as with system 100. The logistics computer program of the present invention interfaces with numerous different types of communications means to thereby permit communication of data to the central database either directly or indirectly through another system such as system 100.

Figure 8:
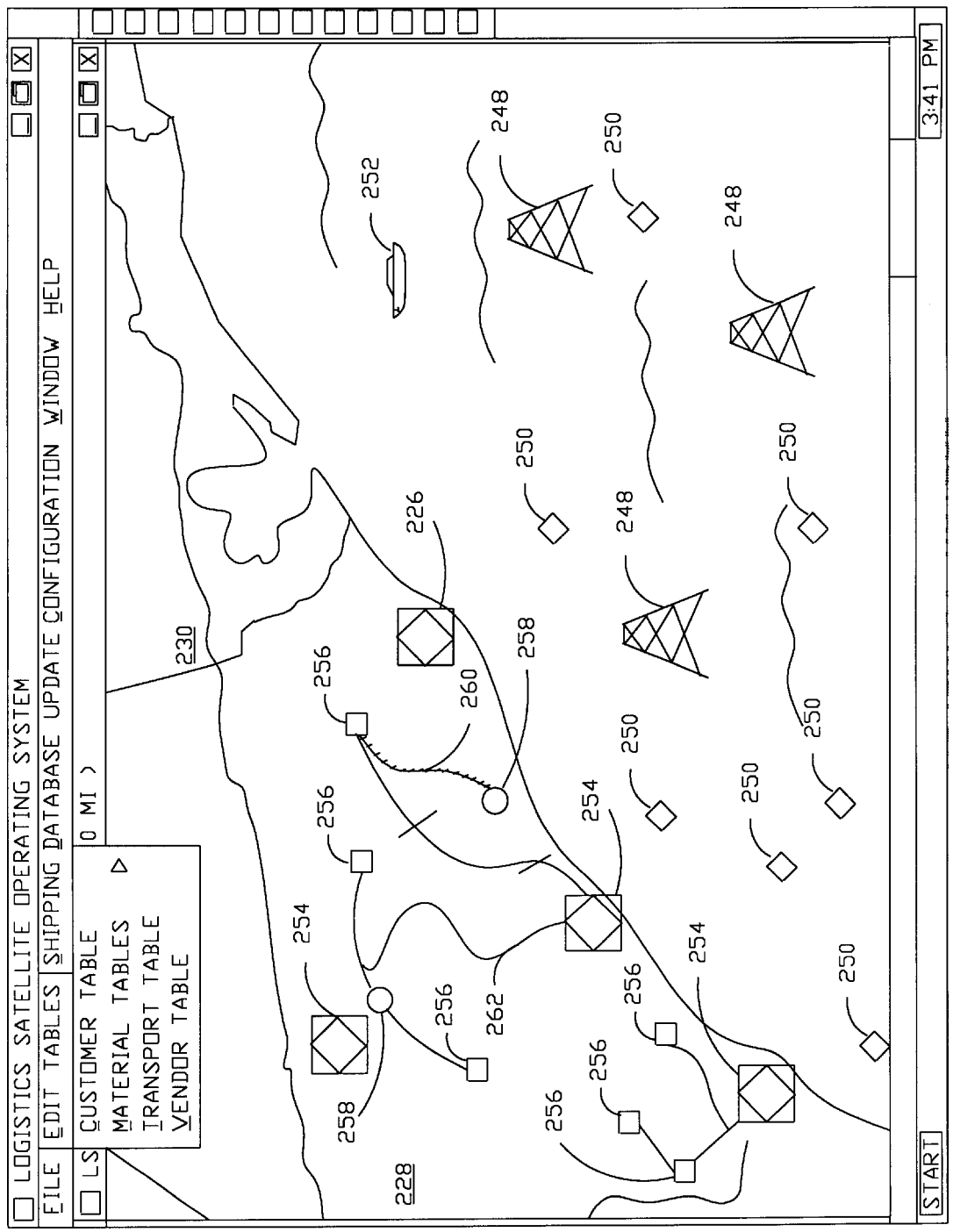
FIG. 8 is a schematic showing a computer main screen with delivery locations and bases indicated thereon in accord with the present invention.

FIG. 8 discloses main screen map 228 of a logistics computer program in accord with the present invention. Map 230 of the operating area is automatically displayed. The map opens centering the location of the operator on the map. In the above the operator is located at base 226 which is indicated by the diamond with a square around it. The symbol for each object may be changed as desired. In a preferred embodiment, main screen map 228 is the basis for initiation of all operations of the logistics computer program of the present invention as indicated in the flow charts of FIG. 10 through FIG. 14. New tables or windows are displayed over map 230 as different functions are accessed as discussed hereinafter. Map 228 may be modified, moved, or changed as desired. The zoom or scale for the map may be changed. The current zoom of the map is displayed at the top as shown at 232 on FIG. 9. A ruler function allows calculation of the distance between two points on the map.

Figure 10:
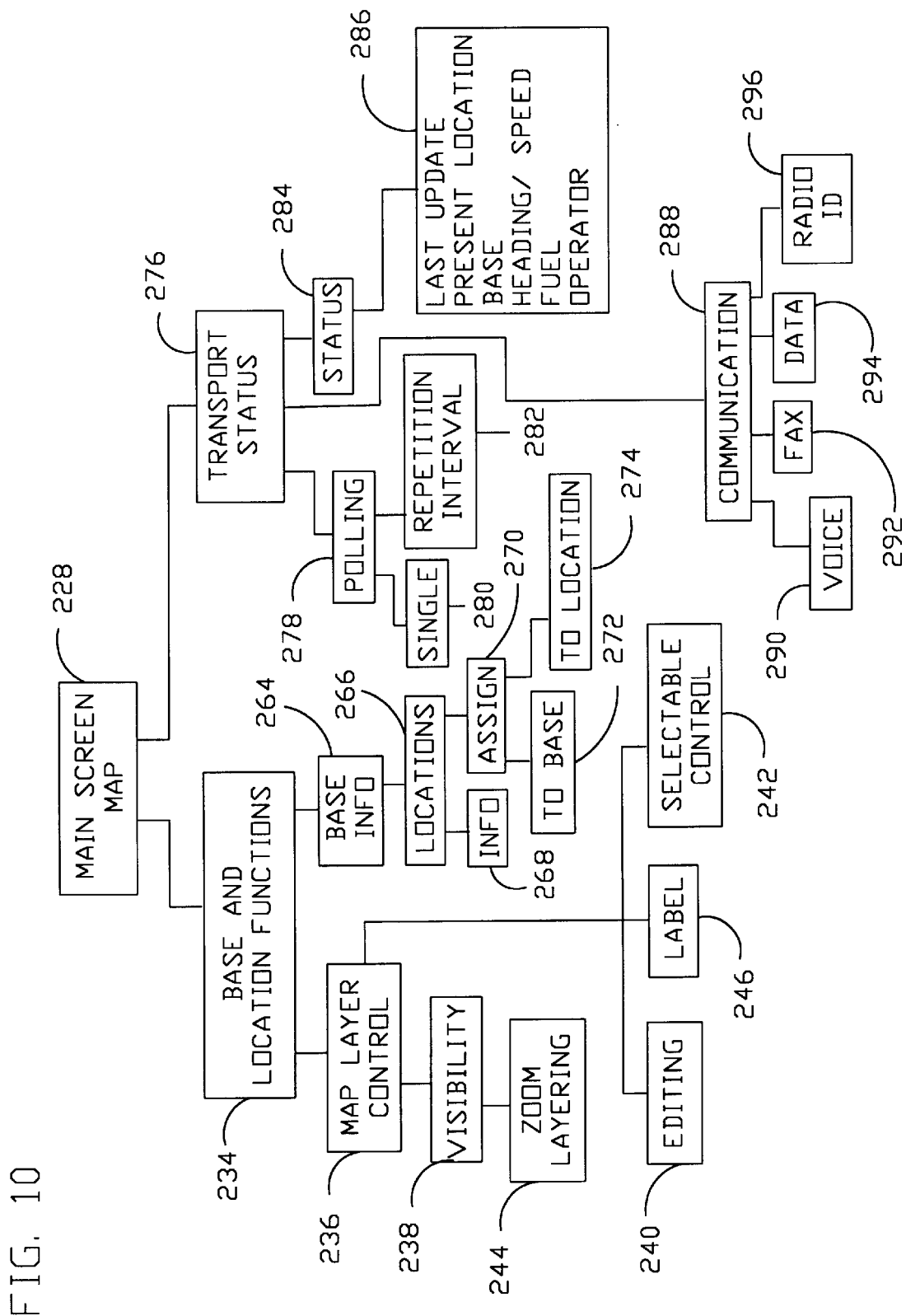
FIG. 10 is a schematic that diagrams base and location functions as well as transport status functions available from the main screen map of a logistics computer program in accord with the invention.

Referring to FIG. 10, base and location functions 234 can be selected to further control map views using map layer control 236 that controls the various layers of the map. Base and location also permit delivery locations to be assigned and unassigned with respect to particular bases that will be used to provide the support. Visibility of the various layers which include different delivery locations, bases, and the like, can be controlled as indicated at 238. Zoom layering at 244 allows the operator to enter a range at which a selected layer becomes visible. The layers may be made to be editable so that changes can be made as indicated at 240. A layer can be made selectable for displaying the information thereon as indicated at 242. Label control 246 allows for various label related functions such as when the label is visible, the type of label and so forth. A particular tag may be used with different items although the tags may be changed as desired. For instance, on FIG. 8 drilling rigs 248 may be used to represent drilling platforms and diamonds 250 may be used to represent production platforms. Supply boats may be represented by boat markers such as marker 252. Bases 254 may be indicated as a diamond surrounded by a square. If desired, vendors 256 could be marked with squares. Cargo containers 258 might be marked with circles. While the preferred embodiment of the present invention is for offshore location supply that typically use boats and helicopters, trains with railroads 260, or trucks with roads 262, and the like such as with planes could also be used.

Base information at 264 in FIG. 10 is obtained by placing the cursor on the base and clicking. Locations can be assigned or unassigned to a particular base through module 266 using assignment functions as indicated at 270 and 272. As well, delivery locations can be assigned to other delivery locations so that a first location supplies a second location as indicated at 274. This feature was discussed earlier with respect to delivery locations 216 in FIG. 7. Information is also available about the delivery locations at 268.

Various help and error trace options are available that allow trace logs and error reports to be viewed by different personnel at different workstations. These can be cleared as desired.

Figure 9:
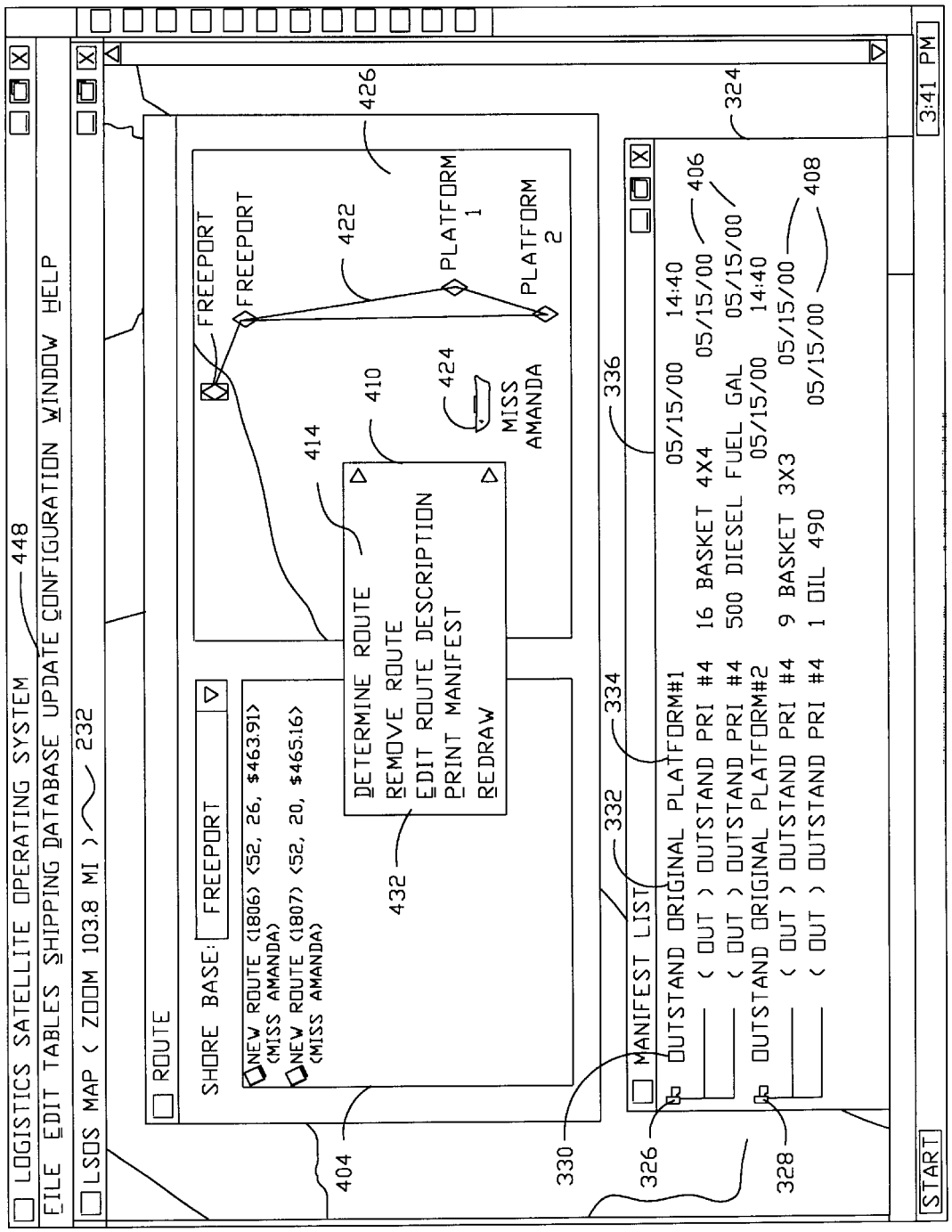
FIG. 9 is a schematic showing a computer screen wherein a manifest is selected to automatically select a transport and transport route for least cost delivery and to calculate and print the delivery costs.
Figure 12:
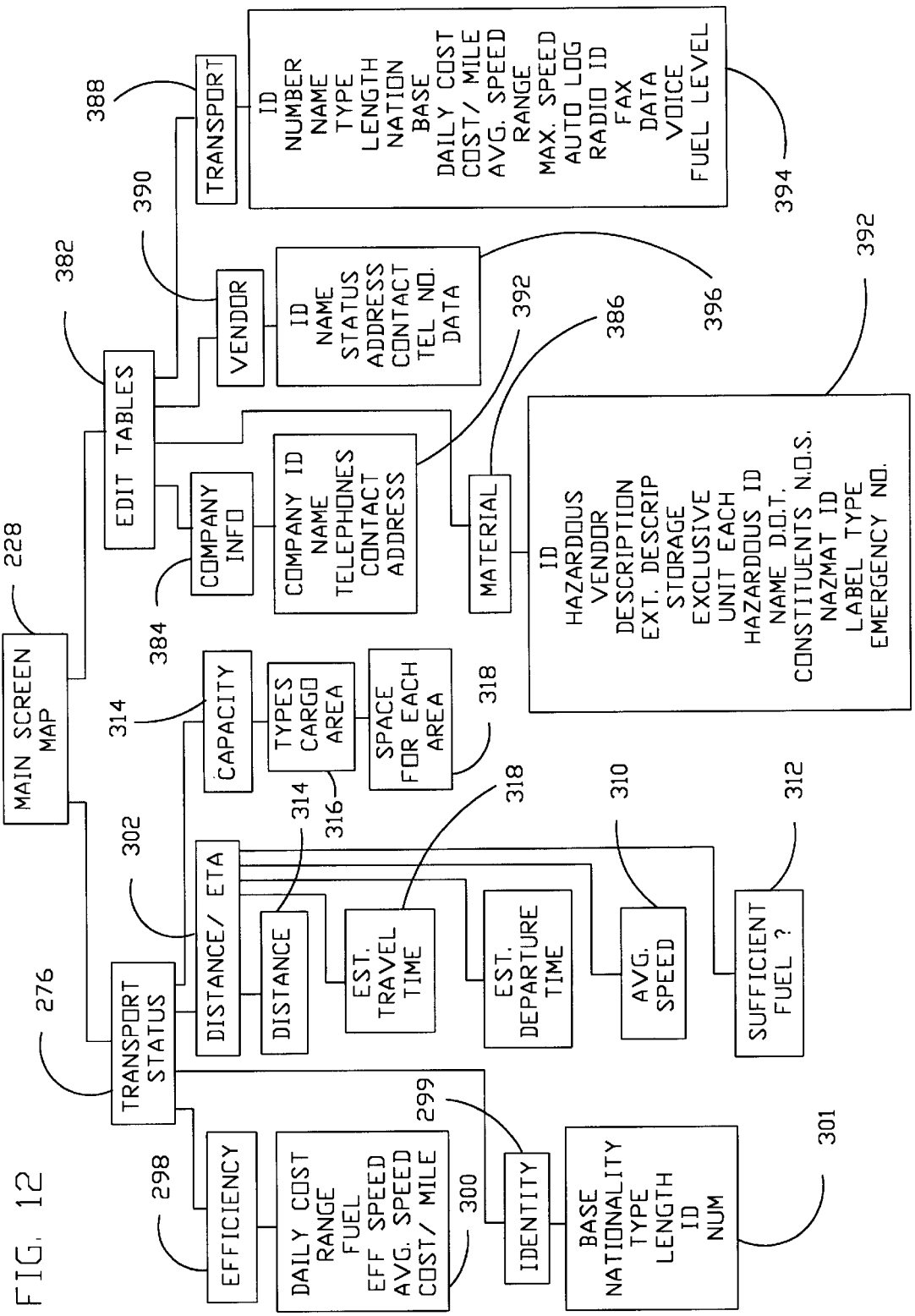
FIG. 12 is a schematic that provides transport status information and the ability to edit various tables of information available from the main screen map of a logistics computer program in accord with the present invention.

Various transport status functions are shown at 276 in both FIG. 10 and FIG. 12 under the same heading of Transport Status. Transport status 276 is selected from the File drop down menu that is located at the top left of the computer screens as indicated in FIG. 8 and FIG. 9.

A poll screen is available as indicated at 278 under Transport status 276 in FIG. 10. This screen displays and allows the user to set the polling communications for a selected transport from a list of transports. Under Single indicated at 280, the user may poll a selected transport at which time the system will poll the selected transport, update all available data from the transport as discussed subsequently, and then wait for new polling directions. To start the polling action, the user places the cursor on a start block and clicks with the left mouse button.

A continuous polling system is also available as indicated at 282 whereby the user is given the choice of polling the selected transport at specified intervals. In this way, near real time information is available for the information on the transport. A typical repetition interval is in minutes such as five minute intervals but the interval rate is selected by the user. If desired, each transport may update at a different repetition interval or they may all have the same interval.

Typical transport status information as indicated at 284 may include such information as the longitude and latitude of the transport, the heading, the speed, the fuel level, the primary base from which the transport operates as indicated at 286. In this way, the present invention is able to keep track at all times of the transports. Other information is also provided such as the name of the operator of the transport and the date and time of the last update from the Oracle server, i.e., the central database. The transport may be viewed on the main screen map as indicated in FIG. 8 at 252 by a boat, helicopter, or other icon and a label with the name. The view will also depend on the layer control features selected.

Communication screen 288 is used to display and/or change the communication data for each selected transport. Voice block 290 lists the telephone number for voice communications with the selected transport. The numbers from screen 288 can be changed as necessary. Fax block 292 provides the fax number. Data block 294 lists the telephone number for data communications with the selected transport. Radio ID block 296 lists the identification number or call sign.

Referring to FIG. 12, additional information is available about each transport. Identity 299 is provided using several means such as those indicated at 301. The logistics program assigns a number to each transport automatically that cannot be changed by the operator. A registration number is listed for each transport. The name of the transport is provided, as well as the type of transport. The transport length is provided. The base to which it is assigned is given. If the transport has an automated log and/or software onboard for transmitting information, this is given. Efficiency screen 298 permits view of efficiency information about each transport as indicated at 300 such as the daily cost, the maximum range of the transport, the efficient speed of the transport, the average speed, the cost per mile, and the fuel level. Distance/ETA screen 302 preferably displays all delivery locations and all transports. The user is allowed to select a delivery location and a transport and view the travel information to the selected location with the selected transport. Such information will preferably show distance 304 between the transport's present location and the delivery location. At 306, the estimated travel time from the transport's present location to the delivery location is displayed. Where applicable, the estimated departure time and estimated arrival time are shown as indicated at 308. The average speed as indicated at 310 is also preferably displayed. The logistics computer program of the present invention will also display other pertinent information such as, for instance, whether the transport has sufficient fuel for the trip as indicated at 312.

Capacity screen 314 is the transport capacity screen that displays all of the storage capacities for the selected transport. The user may view, delete, add or change the capacities for the selected transport. For instance, if a transport has a first storage area of forward deck space that has 500 sq. ft. then this would be listed. Thus, a type of storage space as indicated at 316 and a space as indicated at 318 for each transport is listed. A transport may then have a second storage area on the aft deck of 750 sq. ft. and so forth. The logistics computer program of the present invention uses this information to automatically position the manifested cargo on the selected transport, to determine which transport to select, and so forth. Designation may also be changed manually.

Figure 11:
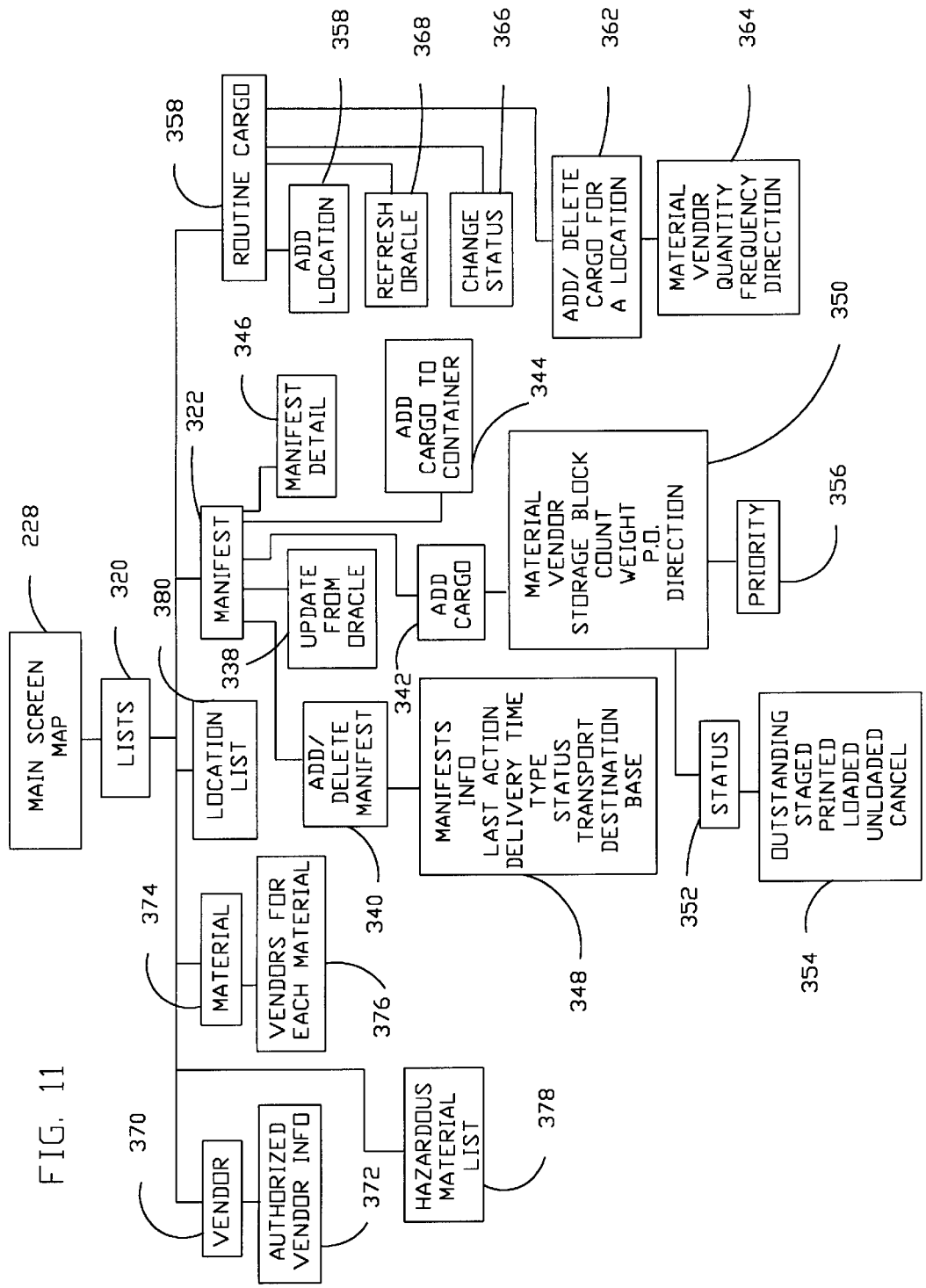
FIG. 11 is a schematic that provides various lists that are available from the main screen map of a logistics computer program in accord with the invention.

The logistics computer program of the present invention uses interconnected lists of information for effecting its purposes. The lists are available for review as indicated in FIG. 11 as indicated at 320 from main screen map 228 by selecting lists from the File drop down menu. In a preferred embodiment, a button is available for each list from the window so produced.

If the manifest list is selected as indicated at 322, a manifest window is displayed that lists the manifest records along with the status, type record, destination, date of the time and request of the materials. An example of a manifest list is provided in FIG. 9. Manifest list window 324 with manifest 326 and 328 shows status 330, type record 332, destination 334, and date and time 336 of the materials request. When the manifest window is displayed, the system preferably will attempt to contact the Oracle™ server and update any manifest records different from the workstation database records as indicated at 338. The records are checked by a dirty flag method and date to assure that the most current records are in the workstation database and the Oracle™ server files. The operator will see a message stating that the database is being refreshed when this occurs. From the manifest window, it is possible to add a manifest from a new location or delete a manifest as indicated at 340, add cargo to a listed manifest requirement as indicated at 342, add cargo to a container as indicated at 344, or obtain manifest details as indicated at 346.

If the add manifest option is selected as indicated at 340, a window appears that provides various information as indicated at 348 some of which can be changed and some not. Last action time and date cannot be changed. The delivery time and date are available for change by the operator. This should be the date and time that the requestor needs the materials to be delivered to their location. A type document block identifies the type of manifest being entered. A status block identifies the status of the manifest. A transport block allows the operator to assign transport if desired. This can be done later and can be changed later either automatically by the logistics computer program or manually. A list of transports is available if this option is selected. A destination block allows the operator to identify the destination of the cargo from a list of destinations. A base block allows identification of a base from which the cargo will be shipped.

If "add cargo" is selected as indicated at 342, then a window appears with a form having several different blocks as indicated at 350. A material block allows the operator to enter to enter a material or container to be shipped to the delivery point on this manifest. A list of all materials is provided for selection. Material can also be dragged from the material list and dropped onto the manifest list. A primary vendor automatically appears in a vendor block. If another vendor is being used, then the operator can select from a list of vendors. A storage block indicates where the cargo is to be placed on the transport as discussed with respect to item 314 above. The storage location is also automatic but may be changed if the cargo is to be stored in another location on the transport. An alternate location can be selected from a list of available cargo spaces as discussed with respect to item 314 above. An exclusive block is used to identify materials that cannot be co-mingled with other cargo and when checked plays a part in the automatic transport selection and dispatching with the logistics computer controlled system of the present invention. A count block is provided that identifies the number of pieces of this cargo to be transported. A unit each block identifies the count within each container. An example would be one box of nine each, identifying that each box contains nine items. A total units block is a system entry that is derived from multiplying the count by the unit each. This number is used in the transport selection and dispatching process. The type of measurement for the cargo is identified at the end of the total units block and is taken from the material files. A weight block is taken from the material files if available but can be entered at this time if desired. A P.O. block is available to enter the purchase order used to obtain the materials identified for shipment. A P.O. date is the date that the purchase order was issued for the materials. A status block is provided as indicated at 352 that identifies the status of the selected manifest as indicated at 354. All new manifests are automatically identified as outstanding. At this time, material has not yet been received at the shipping dock. The status changes as delivery advances. The status is "staged" when the material is received and staged at the delivery dock. The status is "printed" when the manifest is printed and delivered to the transport operator. The status is "loaded" when the materials have been loaded onto the transport. The status is "unloaded" after materials have been delivered to the requestor. A manifest status is "canceled" when the manifest is cancelled. If the manifest includes a container, then the operator may add materials to that container as indicated at 344. The materials within the container can be displayed for review. A screen is provided for the cargo within a container that is similar to that displayed within the manifest and includes vendor, deck space, count, units each, weight, P.O. number, status, priority, remarks, and the like as are discussed herein.

Each manifest also has a priority associated therewith as indicated at 356. The status may be changed by the operator as required. All new manifests are automatically assigned priority #3 as discussed below. Priority #1 is used for emergencies where safety is involved and endangerment to human life exists. Priority #2 is used when operations are down and there is a possibility of a loss of production. Priority #3 is used for routine operational requirements. Priority #4 is used when the materials are required within 30 days of the date of request. Priority #5 is used for long term planning requirements.

A "need date" block identifies the date that the materials are required to be delivered no later than. A "direction" block identifies if cargo on the manifest is being delivered to a location or being returned from a location. A remarks block allows the user to enter any special remarks considered needed for the manifest or cargo. A requester block identifies the requester and cannot be changed. A request block is entered by the system to identify the time and date the manifest was initiated. An unload block is updated by the system and identifies when cargo has been unloaded. A load block identifies when cargo has been loaded for delivery and cannot be changed.

Routine cargo is handled by the logistics program of the present invention as indicated at 358. When routine cargo 358 is selected from the list menu, the routine cargo window appears showing the delivery locations for which routine cargo deliveries are set up. Selecting the delivery locations shows the routine delivery including the cargo, quantity, frequency, and the status. As indicated at 360, delivery locations can be added by selecting a location from a list of delivery locations. Locations and cargo can be deleted from the routine cargo window. As well the status can be changed, as indicated at 366, from active to suspended. The frequency can also be changed. To add routine cargo for a specific location, as indicated at 362, a routine cargo window with various blocks as indicated at 364 is displayed. For some blocks a list may be displayed, such as a list of materials and so forth for selection of the desired materials. The primary vendor will be placed in the vendor block but another vendor may be selected from a list of vendors. A quantity block identifies the quantity of materials to be delivered on a routine basis to the designation location. A frequency block identifies how often the identified cargo is to be delivered. A direction block shows whether the routine cargo is to be delivered to the location or returned from the location. A choice of outgoing or incoming with respect to the base is displayed. A refresh block, as indicated at 368, is provided to refresh the Oracle™ database from the local database such as the workstation database that may be a Microsoft™ database.

When Vendor, as indicated at 370 is selected from list menu 320, a window appears displaying the names of all authorized vendors for the users review. Any vendor can be selected to display the various information associated with each authorized vendor as discussed hereinafter and as indicated at 372 such as name, address, contact, and the like. Likewise, when material as indicated at 374 is selected from the list menu 320, then a window appears that displays a list of all authorized materials and associated vendors, as indicated at 376, for the users review. Much additional information is associated with each material as discussed herein. Likewise, if hazardous material is selected as indicated at 378, then a list of all authorized hazardous materials is made available for the user's review. A list of delivery locations and associated information as discussed herein is also available for review as indicated at 380.

The logistics program of the present invention preferably includes four data tables related to the above discussed lists indicated at 320. The four data tables can be edited for data entry as indicated at 382 in FIG. 12. The tables include company info 384 that includes data on all companies supported by the installation of the system. Material table 386 contains data on all materials to be transported. Transport table 388 contains data on all transports being utilized and supported by the system. Vendor table 390 includes data on all vendors providing materials to be transported.

Selecting company info 384 from edit tables 382 produces a window with a form containing numerous blocks for information related to the company of interest. New companies can be added/deleted from this window. Information such as that shown at 392 may be entered for each company. A company ID is a system assigned number for each company entry and is not editable. The company name is preferably entered in a standard format so as to be compatible for use within the organization and to assure compatibility if data is exchanged between systems in the future. Other information includes mailing or physical address including street and/or post office box number, city, state, ZIP, and country. A primary contact person along with contact information such as a primary telephone number and a secondary telephone number for the contact person is preferably entered. Other telephone numbers such as FAX and data may also be entered.

Selecting material table 386 produces a window with a form that includes numerous blocks to describe each material as indicated at 392. A system ID number is produced for each material that is not editable by the operator. If the material is identified as a hazardous material, an identifier block is checked. The primary vendor that supplies the product is listed. A keyword description is provided. An extended description is also entered. The storage area where this material is normally stored on the transport is entered. If the material cannot be shipped to multiple customers in the same storage area or container, it should be designated as exclusive. A unit each block identifies the count number in each unit of issue, i.e., a box with ten items per box would have a count of ten. If the material is designated as hazardous, then the system gives it a system assigned number. A common name from DOT or department of transport or other official source is preferably listed. If a hazardous material is identified as N.O.S., then the constituents for that material should be listed for emergency response. A HAZMAT ID number is listed for hazardous materials. If a hazardous material has an assigned UN/NA number, then it is entered. An emergency guide number is entered from the Emergency Response Guidebook. Count per containers is the number of items in each container if applicable. An Emergency Response Label type required to be posed for this type of hazardous material should be listed. An emergency response telephone number is listed in this space in case of an emergency for each material.

Selecting transport 388 brings up a form with numerous blocks of information about each transport some of which are indicated at 394. A system ID is assigned to each transport by the system. An official number such as a registration number should be listed. The official name of the transport is provided. The official local type code for the transport is listed as will be different for instance for helicopter, ship, and truck transport. Information related to the important physical parameters of the transport is listed such as the length. The nationality is the nation of registration for the transport. Each transport is assigned to a base from a list of bases. Various cost information is listed such as cost per mile, daily cost, maximum range, maximum speed, fuel capacity, fuel level and the like. The presence of an automatic log on board for automatically updating information such as location intelligence, fuel information, heading, and so forth is noted on this table. The various important contact information such as voice, fax, and data telephone numbers are entered. The radio ID and/or other useful information are provided. Contact persons, operator, or owner information may be included.

Selecting vendor 390 produces an entry form that has blocks such as those noted at 396 for each vendor. Such information would include a system generated vendor I.D. number that is not subject to edit. The name of the vendor company is entered. A vendor status of either authorized or unauthorized is selected depending on whether the vendor is presently authorized to furnish materials. A vendor address, contact name, title of the contact person, main and secondary numbers for the contact person, as well as fax and data telephone numbers may be entered.

Figure 13:
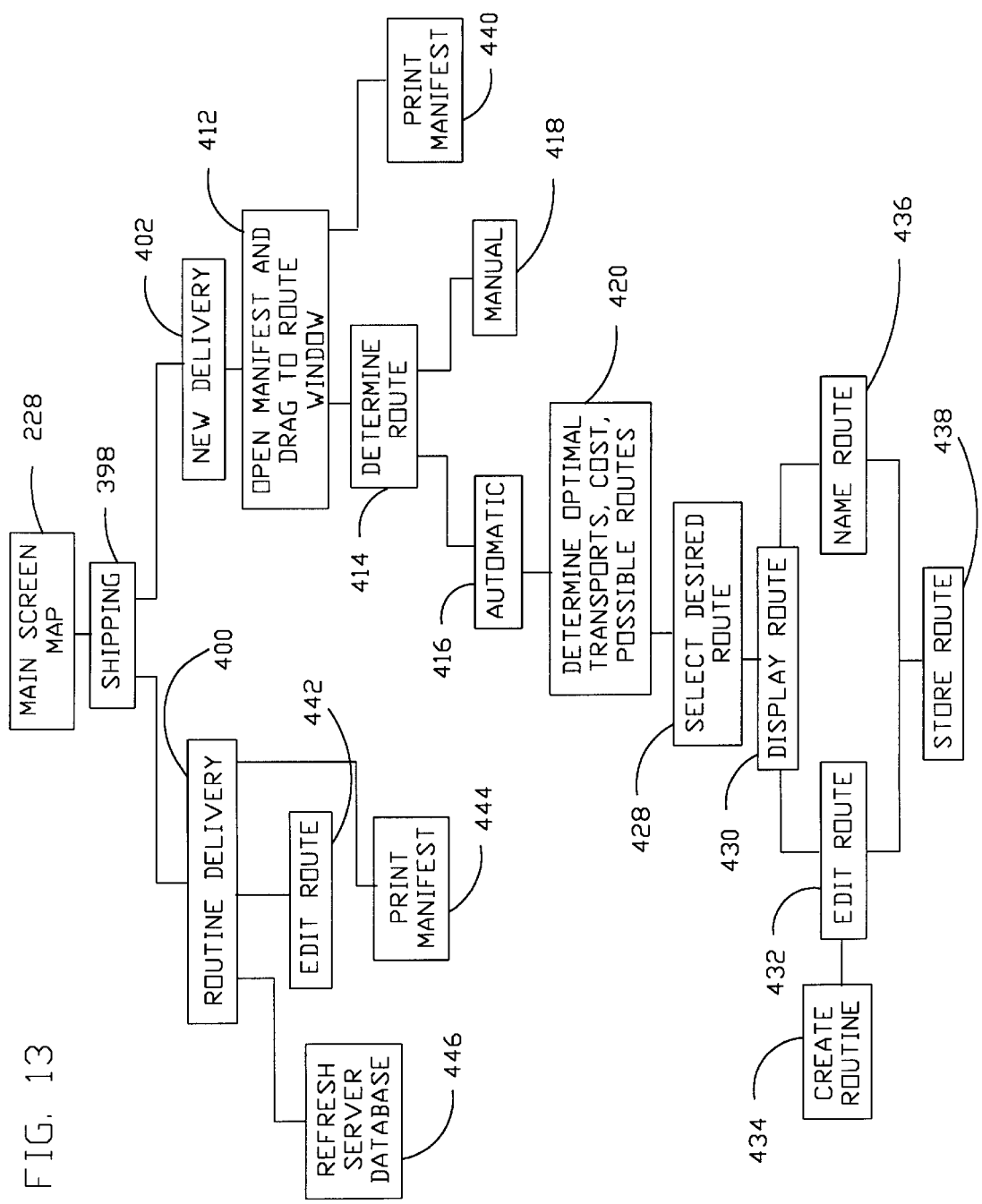
FIG. 13 is a schematic that provides for shipping control for new and routine deliveries that is available from the main screen map of logistics computer programming in accord with the present invention.

To manifest and dispatch transports using the logistics computer program of the present invention, the operator selects shipping 398 from main screen map 228 as indicated in FIG. 13. When shipping 398 is selected, a drop down menu appears showing two options of either routine delivery 400 or new delivery 402.

When new delivery 402 is selected, a route window 404 is displayed as shown in FIG. 9. The user opens the manifest list 322 (FIG. 11) as indicated at 412 (FIG. 13) to show manifest window 324 as per FIG. 9 to allow visibility of the cargo requiring shipment such as manifest 326. Cargo in each manifest can be shown such as by expanding manifest 326 or 328 to see cargo 406 or 408 (FIG. 9). The logistics computer program of the present invention is designed to automatically select the best suited transport and route to support the requirements for delivery. The user must identify the manifested cargo to be calculated by the system such as by dragging the desired manifest into route window 404. The user continues this process until all of the desired manifested cargo to be shipped are displayed in route window 404. After the desired manifested cargo is moved into route window 404, the user starts the system routing process by placing the cursor into route window 404 and clicking the right mouse button at which time drop down menu 410 is displayed giving the user options such as determining routes or removing delivery locations from those selected and placed in window 404 for routing. As suggested in FIG. 13, selecting determine route 414 as also shown in FIG. 9, displays options automatic 416 and manual 418. Selecting manual 418 allows the user to select the transport to be used, and the route to be followed in the delivery routing process. Selecting automatic 416 allows the system to conduct transport selections, calculate cost, and develop possible routes to be viewed for producing the lowest cost and most desirable routing as indicated at 420.

When automatic 416 is selected, the system will calculate the most economical transport that has the capabilities to carry the required cargo, calculate the economical route for the transport and price out the associated deliveries. A calculated route 422 with Miss Amanda 424 calculated as the most economical transport is shown in window 426 of FIG. 9. The system preferably will furnish as many as five transports or routes for the operator to choose from. The user may place the cursor on each of the identified possibilities and the system will show the route in adjacent window 426 such as route 422. This procedure is indicated in FIG. 13 at 428 and 430.

When manual 418 is selected, the system will display the route information without dollars, transport, or other data. A transport may be assigned to the route whereupon the system automatically calculates the route cost and other data for the user. The user can then proceed with the dispatching process. Selecting edit route at 432 in FIG. 13 and shown in FIG. 9, displays information for the selected route including a unique route identification number, cost data, dates, and other related information some of which can be edited as desired. If desired, a routine route may be created as suggested at 434. The route is named as indicated at 436. If desired, the route can be stored for future use as indicated at 438 in FIG. 13.

Prior to printing the manifest as indicated at 440 in FIG. 13, the user may preview the actual manifest documents by placing an "x" in a preview first box. The system displays all cargo items for the manifest associated with the delivery route. After the manifest is printed, the manifest status will be updated. In a preferred embodiment, only the assigned base may print the manifest for delivery to a respective location.

When the user needs to use a standard/routine route as indicated at 400, and there are no changes required for the route as indicated at 442, the user may print the manifest directly from the standard route window as indicated at 444. From this window the user may also refresh the server database as indicated at 446.

Figure 14:
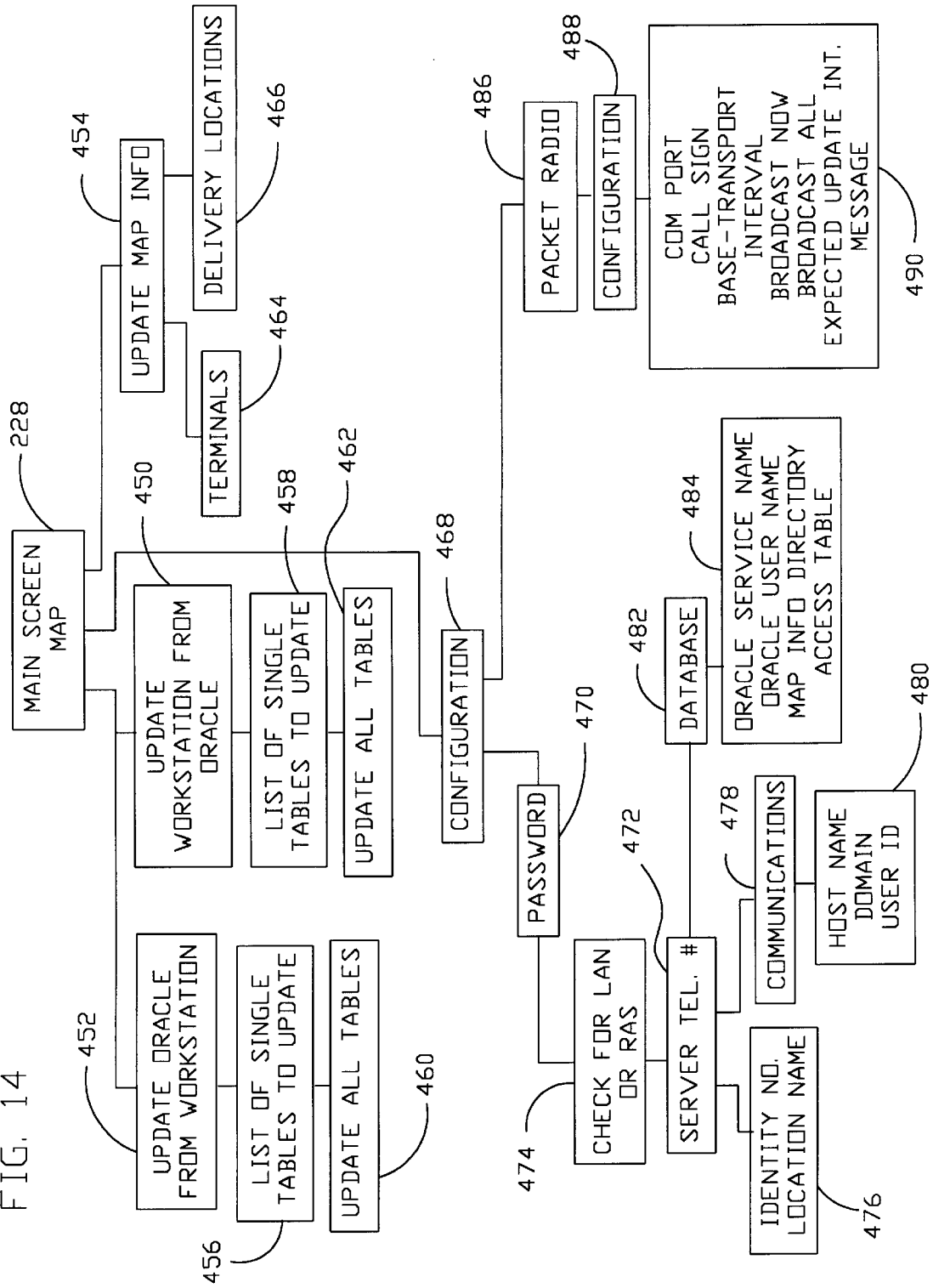
FIG. 14 is a schematic that allows for transferring information to and from a central database in accord with the present invention.

Database update 448, seen along the top of the screen in FIG. 8 and FIG. 9, permits the operator to update all workstation databases, such as Microsoft™ databases from the Oracle™ server database as indicated at 450 in FIG. 14, to update all Oracle™ databases from the workstation database as indicated at 452, and to update all Map Info Map Tables from the workstation database as indicated at 454. It is desirable to update the Oracle™ databases first so as to avoid losing information if the workstation database is first updated.

Upon selection of updating either Oracle™ or the workstation databases, a list of tables to update is provided as indicated at 456 and 458 where individual tables may be selected for updating. It is also possible to simply select to update all tables as indicated at 460 and 462. Preferably, as each table is updated, it appears in a window with the results of the update. When the user selects to update map info, an option is provided for updating either the table for all of the terminals as indicated at 464 or for all of the delivery locations as indicated at 466.

Configuration 468 may also be selected from the main screen to configure the communications within the logistic computerprogram of the present invention. The standard program preferably includes two configurations, General and Packet Radio. When General is selected, a password is necessary as indicated at 470. A telephone number for the Oracle™ server is entered at 472. However, the system checks for a LAN network and if one is found, it will operate using the LAN as indicated at 474. If no LAN is detected or if the LAN is or becomes inoperative, then the system will make a RAS connection and update using the RAS connection. A location ID and name are preferably entered as per 476. A communications window as indicated at 478 is available for entering a host name, a domain name, workstation password, and a user ID as shown by 480. A database window as indicated at 482 is utilized to enter the Oracle™ service name, Oracle™ username, map information directory, and database access tables as indicated at 484. If a packet modem and radio are used for transfer of data within the system, the system must be configured for this operation as indicated at 486. When the packet radio selection is made for a configuration as indicated at 488, the system will display forms for entering the configuration information as indicated at 490. The available communications ports are shown for selection. A call sign block is used to enter the radio call sign assigned to the packet radio and modem. The role block permits the user to select either base or transport. The interval is activated if transport is the role and allows the user to enter the interval at which the packet radio will attempt to make contact with all support bases. The broadcast now block is activated for immediate one time broadcast from the transport. A broadcast all block is only activated if base is selected as the role whereupon all transports' GPS information is immediately broadcast. Expected update interval is activated if transport is selected and allows the interval that GPS information is to be updated. A terminal on block allows a typed message to be transmitted with the next transmission.

The foregoing disclosure and description of the invention are illustrative and explanatory thereof, and it will be appreciated by those skilled in the art, that various changes may be made in the system integration and components as well as in the details of the illustrated arrangements or combinations of features without departing from the spirit of the invention. For instance, in one embodiment of the invention, a system such as that shown in FIG. 2 or FIG. 3 whereby users of cargo containers can check the contents and position of their containers on a worldwide basis. The cargo container would have material listed for each user that would be available only to that user and which might be checked over the Internet as discussed previously. GPS information may be derived from the transport or from a GPS device attached to the cargo container itself. Thus, a person who is shipping material in a cargo container can check on the position of his cargo and check into the details of what is packed in that container as pertains to that person. Another person sharing the same container could check what is listed for himself but would not be able to review cargo of another person. A shipper may have access to all information and be able to produce a manifest for customs purposes and the like. It may be that two-way communication is used such that the cargo may send or receive signals to effect various purposes, activate alarms, etc., as discussed above.

Thus, the invention may be used in many formats for tracking and monitoring as well as the logistics purposes discussed hereinbefore.

What is claimed is:

1. A logistics method for a plurality of transports operating to supply a plurality of delivery locations from a plurality of bases using logistics computer programming, comprising:

providing respective computers at said plurality of bases and at said plurality of delivery locations;

providing a central database for said respective computers, each of said respective computers operable for communication with said central database, said logistics computer programming being operable for providing updated logistics information to said central database from said respective computers;

automatically communicating at selected intervals with said plurality of transports to provide transport location intelligence so as to be operable for automatically communicating at any geographical position for each of said plurality of transports while traveling between said plurality of bases and said plurality of delivery locations;

automatically storing said transport location intelligence in said central database;

storing transport information relating to each of said plurality of transports in said central database; and storing a list of materials in said central database, said materials being selectable from said list of materials to produce a second list of materials, said second list of materials comprising a manifest of manifested materials for delivery to one or more of said plurality of delivery locations by one of said plurality of transports.

2. The method of claim 1, further comprising:
said step of automatically communicating to provide transport location intelligence includes providing latitude and longitude information.

3. The method of claim 1, further comprising:
said step of automatically communicating to provide transport location intelligence includes providing fuel level for a respective transport.

4. The method of claim 1, further comprising:
said step of storing transport information includes storing cost/mile and storage space available.

5. The method of claim 4, further comprising:
originating said manifest from one of said plurality of bases or from one of said plurality of delivery locations, and said logistics computer programming automatically determining a delivery route based on said cost/mile, said storage space available, and said manifest.

6. The method of claim 1, further comprising:
originating said manifest at one of said plurality of bases or one of said plurality of delivery locations, and updating said central database to include said manifest.

7. The method of claim 6, further comprising:
said logistics computer programming associating a status with said manifest.

8. The method of claim 7, wherein said status comprises a relationship to a shipment of materials in said manifest such that said shipment is outstanding, staged, loaded, unloaded, or canceled.

9. The method of claim 1, further comprising:
said logistics computer programming displaying a main screen with a geographical map that includes at least one base from said plurality of bases and selectable delivery locations assigned to said based from said plurality of delivery locations, said logistics computer programming being operable for displaying one or more delivery routes for one or more of said plurality o transports on said geological map.

10. The method of claim 1, further comprising:
associating each of said materials with vendor information, storing said vendor information in said central database, and said logistics computer programming storing interconnected tables at said central database related to said materials, said vendors, said plurality of delivery locations, and an operating company.

11. The method of claim 1, further comprising:
associating said list of materials with a hazardous or a non-hazardous designation for each material.

12. The method of claim 11, further comprising:
associating with each hazardous material a hazardous I.D, a DOT name, and an emergency number.

13. The method of claim 1, further comprising:
associating said list of materials with a type of storage required.

14. A logistics method for a plurality of transports to supply a plurality of delivery locations from one or more bases using logistics computer programming, comprising:

providing respective computers at said one or more bases and at said plurality of delivery locations;

providing a central database for said respective computers, each of said respective computers being operable for communication with said central database, said logistics computer programming being operable for providing updated logistics information to said central database from said respective computers;

storing transport information relating to each of said plurality of transports in said central database;

storing a list of materials in said central database, said materials being selectable to produce a manifest with manifested materials for delivery to one or more of said plurality of delivery locations by one of said plurality of transports;

selectively originating said manifest from at least one of said plurality of delivery locations or said one or more bases by selecting from said list of materials to produce a second list of materials for delivery to said at least one of said plurality of delivery locations;

associating a delivery status with said manifest; and updating said central database to include said manifest.

15. The method of claim 14, wherein said delivery status associated with said manifest indicates when said manifest is outstanding, loaded, or unloaded.

16. The method of claim 14, wherein said delivery status associated with said manifest indicates when said manifest is staged or cancelled.

17. The method of claim 14, further comprising:

updating said central database when said delivery status changes.

18. The method of claim 14, further comprising:

associating a priority status with said manifest.

19. The method of claim 14, further comprising:

associating with each manifested material a vendor for said manifested material, a count, and a weight.

20. The method of claim 14, further comprising:

associating with each manifested material a storage place where said material is placed on said one of said plurality of transports such that a plurality of different storage places are designated on said one of said plurality of transports.

21. The method of claim 20, further comprising:

said computer logistics programming automatically selecting said storage place from said plurality of different storage places.

22. A logistics method for a plurality of transports to supply a plurality of delivery locations from one or more bases using logistics computer programming, comprising:

providing respective computers at said one or more bases and at said plurality of delivery locations;

providing a central database for said respective computers, each of said respective computers being in communication with said central database, said logistics computer programming being operable for providing updated logistics information to said central database from said respective computers;

storing transport information relating to each of said plurality of transports in said central database;

storing a list of materials, said materials being selectable to produce a manifest with manifested materials for delivery to one or more of said plurality of delivery locations by one of said plurality of transports;

storing delivery location information in said central database related to each of said plurality of delivery locations;

automatically determining a route for delivering said manifested materials.

23. The method of claim 22, further comprising:

automatically selecting a most economical transport from said plurality of transports having capabilities for carrying said manifested materials to said one or more of said plurality of delivery locations from said plurality of transports.

24. The method of claim 22, further comprising:

manually selecting a transport listed in said logistics computer programming, and automatically determining an economical route for delivering said manifested materials using said selected transport.

25. The method of claim 22, further comprising:

automatically pricing out associated deliveries of said manifested materials.

26. The method of claim 22, further comprising:

automatically determining a plurality of possible routes for selection.

27. The method of claim 22, wherein:

each manifested material is associated with a location to which it is to be delivered.

28. The method of claim 22, further comprising;

automatically communicating with said plurality of transports to provide transport location intelligence so as to be operable for automatically communicating at any geographical position for each of said plurality of transports while traveling between said plurality of bases and said plurality of delivery locations.

29. The method of claim 22, further comprising:

originating said manifest at one of said plurality of delivery locations or said one or more bases, and updating said central database to include said manifest.

30. A logistics method for a plurality of transports to supply a plurality of delivery locations from one or more bases using logistics computer programming, comprising:

providing for respective computers at said one or more bases and at said plurality of delivery locations;

providing a central database for said respective computers, each of said respective computers being in communication with said central database, said logistics computer programming being operable for providing updated logistics information to said central database from said respective computers;

storing transport information relating to each of said plurality of transports in said central database, said transport information including daily cost and cost/mile information;

storing a list of materials, said materials being selectable from said list of materials to produce a second list of materials comprising a manifest with manifested materials for delivery to one or more of said plurality of delivery locations by one of said plurality of transports;

storing delivery location information in said central database related to each of said plurality of delivery locations; and storing a list of manifests in said central database relating to deliveries for said plurality of delivery locations.

31. The method of claim 30, further comprising;

automatically communicating with at least one of said plurality of transports to provide transport location intelligence so as to be operable for automatically communicating at any geographical position for each of said plurality of transports while traveling between said plurality of bases and said plurality of delivery locations.

32. The method of claim 30, further comprising:

originating said manifest at one of said plurality of delivery locations or bases, and updating said central database to include said manifest.

33. A monitoring system for use with a plurality of containers having cargo therein on behalf of a plurality of clients having a plurality of client computers, any one of said plurality of clients being associated only with specifically-designated of said plurality of containers, said method comprising:

a computer network server operable for communicating with said plurality of client computers;

a database operable for storing information relating to each of said containers and said cargo therein;

a wireless communication transmitter associated with each of said plurality of containers for providing container location intelligence for each of said containers, said container location intelligence being stored in said database; and said plurality of client computers being operable for accessing information from said database to determine container location intelligence and a respective listing of cargo for each of said plurality of clients only for said containers designated as being associated with each particular client.

34. The monitoring system of claim 33, wherein:

said computer network server is operable for communicating with said plurality of client computers over an Internet connection.

35. The monitoring system of claim 33, further comprising:

said plurality of client computers being operable for producing a map showing thereon a geographic picture that locates one or more containers.

36. The monitoring system of claim 33, wherein:

each of said plurality of client computers being operable for selectively communicating with one or more of said plurality of containers with which said client is associated.

* * * * *